US011935513B2

(12) United States Patent
Fridman et al.

(10) Patent No.: US 11,935,513 B2
(45) Date of Patent: Mar. 19, 2024

(54) APPARATUS, SYSTEM, AND METHOD OF ACTIVE ACOUSTIC CONTROL (AAC)

(71) Applicant: SILENTIUM LTD., Nes Ziona (IL)

(72) Inventors: Tzvi Fridman, Nes Tziona (IL); Mordehay Elbaz, Tel Aviv (IL); Alon Fleischer, Rishon Lezion (IL); Iddo Sheinfeld, Beer Yaakov (IL); Ariel Yemini, Petah Tikva (IL)

(73) Assignee: SILENTIUM LTD., Nes Ziona (IL)

( * ) Notice: Subject to any disclaimer, the term of this patent is extended or adjusted under 35 U.S.C. 154(b) by 0 days.

(21) Appl. No.: 17/852,104

(22) Filed: Jun. 28, 2022

(65) Prior Publication Data

US 2022/0324290 A1 Oct. 13, 2022

Related U.S. Application Data

(63) Continuation-in-part of application No. 17/225,891, filed on Apr. 8, 2021, which is a continuation of (Continued)

(51) Int. Cl.
*B60H 1/00* (2006.01)
*G10K 11/178* (2006.01)

(52) U.S. Cl.
CPC .. *G10K 11/17881* (2018.01); *G10K 11/17815* (2018.01); *G10K 2210/1282* (2013.01); *G10K 2210/3055* (2013.01); *H04R 2499/13* (2013.01)

(58) Field of Classification Search
None
See application file for complete search history.

(56) References Cited

U.S. PATENT DOCUMENTS 5,129,003 A 7/1992 Saruta
5,245,664 A 9/1993 Kinoshite et al.
(Continued)

FOREIGN PATENT DOCUMENTS

CN 107424596 12/2017
CN 207068465 U 3/2018
(Continued)

OTHER PUBLICATIONS

Kuo et al.; "Active noise control: a tutorial review"; Jul. 1999; Proceedings of the IEEE; vol. 87, No. 6; pp. 943-973. (Year: 1999).*
(Continued)

*Primary Examiner* — Umut Onat
(74) *Attorney, Agent, or Firm* — Shichrur & Co.

(57) ABSTRACT

For example, a controller of an Active Acoustic Control (AAC) system may be configured to process input information, the input information including AAC configuration information corresponding to a configuration of AAC in a sound control zone; a plurality of noise inputs representing acoustic noise at a plurality of noise sensing locations; and a plurality of residual-noise inputs representing acoustic residual-noise at a plurality of residual-noise sensing locations within the sound control zone. For example, the controller may determine a sound control pattern to control sound within the sound control zone based on the AAC configuration information, the plurality of noise inputs, and the plurality of residual-noise inputs. For example, the controller may output the sound control pattern to a plurality of acoustic transducers.

28 Claims, 9 Drawing Sheets

Related U.S. Application Data application No. 17/080,047, filed on Oct. 26, 2020, now Pat. No. 11,034,211.

(60) Provisional application No. 63/216,123, filed on Jun. 29, 2021, provisional application No. 62/926,510, filed on Oct. 27, 2019.

(56) References Cited

U.S. PATENT DOCUMENTS

| | | | | |
|---|---|---|---|---|
| 5,416,844 | A | 5/1995 | Nakaji et al. | |
| 9,431,001 | B2 | 8/2016 | Cherkassky et al. | |
| 11,034,211 | B2 | 6/2021 | Fridman et al. | |
| 11,328,702 | B1 | 5/2022 | Xiao et al. | |
| 2006/0269078 | A1* | 11/2006 | Sakamoto | G10K 11/1783 381/71.1 |
| 2010/0080399 | A1 | 4/2010 | Pfau et al. | |
| 2010/0082201 | A1 | 4/2010 | Pfau et al. | |
| 2012/0257763 | A1* | 10/2012 | Bowden | G10K 11/17823 381/71.4 |
| 2012/0288110 | A1 | 11/2012 | Cherkassky et al. | |
| 2015/0193195 | A1* | 7/2015 | Lin | H04R 3/12 700/94 |
| 2015/0224848 | A1 | 8/2015 | Eisenhour | |
| 2015/0300684 | A1 | 10/2015 | Mehta et al. | |
| 2016/0086592 | A1 | 3/2016 | Saxman et al. | |
| 2016/0111078 | A1 | 4/2016 | Barath et al. | |
| 2016/0163303 | A1 | 6/2016 | Benattar et al. | |
| 2017/0032806 | A1* | 2/2017 | Konjeti | G10K 11/17854 |
| 2017/0213541 | A1 | 7/2017 | MacNeille et al. | |
| 2017/0323639 | A1 | 11/2017 | Tzirkel-Hancock et al. | |
| 2018/0012589 | A1 | 1/2018 | MacNeille et al. | |
| 2018/0190258 | A1 | 7/2018 | Mohammad et al. | |
| 2018/0206055 | A1 | 7/2018 | Di Censo et al. | |
| 2019/0189103 | A1 | 6/2019 | Biermeier | |
| 2019/0232867 | A1* | 8/2019 | Bednar | H04R 1/025 |
| 2020/0074975 | A1 | 3/2020 | Torres | |
| 2020/0193956 | A1 | 6/2020 | Kim et al. | |
| 2020/0218501 | A1 | 7/2020 | Fridman et al. | |
| 2021/0014600 | A1* | 1/2021 | Neumaier | G01S 15/8906 |
| 2021/0221196 | A1 | 7/2021 | Fridman et al. | |

FOREIGN PATENT DOCUMENTS

| | | | |
|---|---|---|---|
| CN | 111091805 | A | 5/2020 |
| CN | 111968613 | | 11/2020 |
| EP | 1 577 879 | | 9/2005 |
| JP | 2010156826 | | 7/2010 |
| KR | 20190047976 | A | 5/2019 |
| WO | 2008/090544 | A2 | 7/2008 |
| WO | 2019124772 | | 6/2019 |
| WO | 2021250237 | A1 | 12/2021 |

OTHER PUBLICATIONS

International Search Report and the Written Opinion for International Application No. PCT/IB2020/060034, dated Feb. 25, 2021, 11 pages.

Notice of Allowance for U.S. Appl. No. 17/080,047, dated Feb. 9, 2021, 14 pages.

Corrected Notice of Allowability for U.S. Appl. No. 17/080,047, dated Mar. 26, 2021, 8 pages.

International Preliminary Report on Patentability for International Application No. PCT/IB2020/060034, dated May 12, 2022, 7 pages.

International Search Report and the Written Opinion for International Application No. PCT/IB2022/056026, dated Oct. 20, 2022, 18 pages.

Hyundai Motor Company Showcases Next-Generation Separated Sound Zone Technology. (Retrieved on Oct. 6, 2022). Retrieved from the Internet: <https://www.hyundai.com/worldwide/en/company/newsroom/hyundai motor-company-showcases next-generationseparated-sound-zone-technology-0000016024> Hyundai Motor Company, Aug. 13, 2018 (Aug. 13, 2018), 2 pages.

Office Action for U.S. Appl. No. 17/225,891, dated Sep. 18, 2023, 52 pages.

International Search Report and the Written Opinion for International Application No. PCT/IB2023/056647, dated Nov. 15, 2023, 34 pages.

Search Report for European Patent Application No. 20881145.5, dated Nov. 15, 2023, received on Jan. 3, 2024, 12 pages.

* cited by examiner

APPARATUS, SYSTEM, AND METHOD OF ACTIVE ACOUSTIC CONTROL (AAC)

CROSS-REFERENCE

This application claims the benefit of and priority from U.S. Provisional Patent Application No. 63/216,123 entitled "Apparatus, System, and Method of Active Acoustic Control (AAC) in a Vehicle", filed Jun. 29, 2021, and is a Continuation In Part (CIP) of U.S. patent application Ser. No. 17/225,891 entitled "Apparatus, System, and Method of Active Noise Control (ANC) based on Heating, Ventilation and Air Conditioning (HVAC) Configuration", filed Apr. 8, 2021, which is a Continuation of U.S. patent application Ser. No. 17/080,047 entitled "Apparatus, System, and Method of Active Noise Control (ANC) based on Heating, Ventilation and Air Conditioning (HVAC) Configuration", filed Oct. 26, 2020, which in turn claims the benefit of and priority from U.S. Provisional Patent Application No. 62/926,510 entitled "Apparatus, System, and Method of Active Noise Control (ANC) based on Heating, Ventilation and Air Conditioning (HVAC) Configuration", filed Oct. 27, 2019, the entire disclosures of which are incorporated herein by reference.

TECHNICAL FIELD

Aspects described herein generally relate to Active Acoustic Control (AAC).

BACKGROUND

Active Noise Control (ANC) is a technology using digitally generated noise to reduce unwanted noise. It is based on the principle of superposition of sound waves. Generally, sound is a wave, which is traveling in space. If another, second sound wave having the same amplitude but opposite phase to the first sound wave can be created, the first wave can be totally cancelled.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
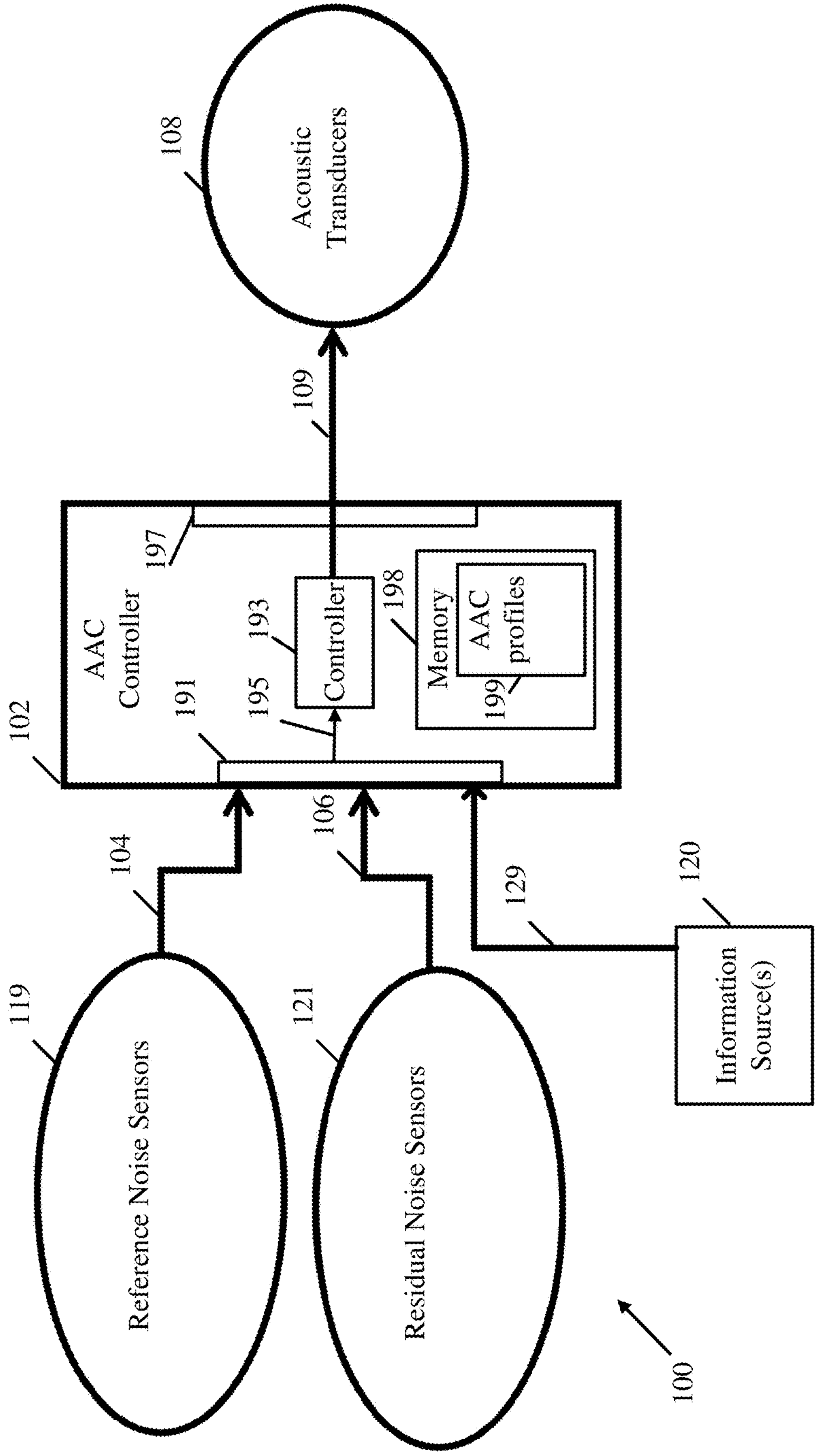
FIG. 1 is a schematic block diagram illustration of an Active Acoustic Control (AAC) system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Some demonstrative aspects include systems and methods, which may be efficiently implemented for controlling noise, for example, reducing, reshaping, and/or eliminating undesirable noise, for example, noise in one or more frequency ranges, e.g., generally low, mid and/or high frequencies, as described below.

Some demonstrative aspects may include methods and/or systems of Active Acoustic Control (AAC) configured to control and/or change acoustic energy and/or wave amplitude of one or more acoustic patterns produced by one or more acoustic sources, which may include known and/or unknown acoustic sources, e.g., as described below.

In some demonstrative aspects, an AAC system may be configured as, and/or may perform one or more functionalities of, an Active Noise Control (ANC) system, and/or an Active Sound Control (ASC) system, which may be configured to control, change, reshape, reduce and/or eliminate the noise energy and/or wave amplitude of one or more acoustic patterns ("primary patterns") produced by one or more noise sources, which may include known and/or unknown noise sources, e.g., as described below.

In some demonstrative aspects, an AAC system may be configured to produce an acoustic control pattern (also referred to as "sound control pattern" or "secondary pattern"), e.g., including a destructive noise pattern and/or any other sound control pattern, e.g., as described below.

In some demonstrative aspects, the AAC system may be configured to generate the acoustic control pattern, for example, based on one or more of the primary patterns, for example, such that a controlled sound zone, for example, a reduced noise zone, e.g., a quiet zone, may be created by a combination of the secondary and primary patterns, e.g., as described below.

In some demonstrative aspects, the AAC system may be configured to control, reduce, reshape, and/or eliminate noise within a predefined location, area or zone (also referred to as "the sound control zone, "the acoustic control zone", "the noise-control zone", the "quiet zone", and/or the "Quiet Bubble™"), without, for example, regardless of, and/or without using a-priori information regarding the primary patterns and/or the one or more noise sources, e.g., as described below.

For example, the AAC system may be configured to control, reduce, reshape, and/or eliminate noise within the acoustic control zone (sound control zone), e.g., independent of, regardless of and/or without knowing in advance one or more attributes of one or more of the noise sources and/or one or more of the primary patterns, for example, the number, type, location and/or other attributes of one or more of the primary patterns and/or one or more of the noise sources, e.g., as described below.

Some demonstrative aspects are described herein with respect to AAC systems and/or methods configured to reshape, reduce and/or eliminate the noise energy and/or wave amplitude of one or more acoustic patterns within a quiet zone, e.g., as described below.

However, in other aspects, the AAC and/or sound control systems and/or methods may be configured to control in any other manner any other acoustic energy and/or wave amplitude of one or more acoustic patterns within an acoustic control zone (sound control zone), for example, to affect, alter and/or modify the sound energy and/or wave amplitude of one or more acoustic patterns within a predefined zone, e.g., as described below.

In one example, the AAC systems and/or methods may be configured to selectively reshape, reduce and/or eliminate the acoustic energy and/or wave amplitude of one or more types of acoustic patterns within the acoustic control zone (sound control zone) and/or to selectively increase and/or amplify the acoustic energy and/or wave amplitude of one or more other types of acoustic patterns within the acoustic control zone; and/or to selectively maintain and/or preserve the acoustic energy and/or wave amplitude of one or more other types of acoustic patterns within the acoustic control zone, e.g., as described below.

In some demonstrative aspects, an AAC system may be configured as, and/or may perform or more functionalities of, a sound control system, for example, a personal sound control system (also referred to as a "Personal Sound Bubble (PSB)™ system"), which may be configured to produce a sound control pattern, which may be based on at least one audio input, for example, such that at least one personal sound zone, may be created based on the audio input, e.g., as described below.

In some demonstrative aspects, the AAC system may be configured to control sound within at least one predefined location, area or zone, e.g., at least one PSB™, for example, based on audio to be heard by a user. In one example, the PSB™ may be configured to include an area around a head and/or ears of the user, e.g., as described below.

In some demonstrative aspects, the AAC system may be configured to control a sound contrast between one or more first sound patterns and one or more second sound patterns in the PSB™, e.g., as described below.

In some demonstrative aspects, for example, the AAC system may be configured to control a sound contrast between one or more first sound patterns of audio to be heard by the user, and one or more second sound patterns, e.g., as described below.

In some demonstrative aspects, for example, the AAC system may be configured to selectively increase and/or amplify the sound energy and/or wave amplitude of one or more types of acoustic patterns within the PSB™, e.g., based on the audio to be heard in the PSB™; to selectively reshape, reduce and/or eliminate the sound energy and/or wave amplitude of one or more types of acoustic patterns within the PSB™, e.g., based on acoustic signals which are to be reduced and/eliminated; and/or to selectively and/or to selectively maintain and/or preserve the sound energy and/or wave amplitude of one or more other types of acoustic patterns within the PSB™, e.g., as described below.

In some demonstrative aspects, the AAC system may be configured to control the sound within the PSB™ based on any other additional or alternative input or criterion.

In some demonstrative aspects, the AAC system may be configured to control, reshape, reduce, and/or eliminate the acoustic energy and/or wave amplitude of one or more of the primary patterns within the sound control zone.

In some demonstrative aspects, the AAC system may be configured to control, reshape, reduce, and/or eliminate noise within the sound control zone in a selective and/or configurable manner, e.g., based on one or more predefined noise pattern attributes, such that, for example, the noise energy, wave amplitude, phase, frequency, direction and/or statistical properties of one or more first primary patterns may be affected by the secondary pattern, while the secondary pattern may have a reduced effect or even no effect on the noise energy, wave amplitude, phase, frequency, direction and/or statistical properties of one or more second primary patterns, e.g., as described below.

In some demonstrative aspects, the AAC system may be configured to control, reshape, reduce and/or eliminate the acoustic energy and/or wave amplitude of the primary patterns on a predefined envelope or enclosure surrounding and/or enclosing the acoustic control zone (sound control zone) and/or at one or more predefined locations within the acoustic control zone (sound control zone).

In one example, the acoustic control zone (sound control zone) may include a two-dimensional zone, e.g., defining an area in which the acoustic energy and/or wave amplitude of one or more of the primary patterns is to be controlled, reshaped, reduced and/or eliminated.

According to this example, the AAC system may be configured to control, reshape, reduce and/or eliminate the acoustic energy and/or wave amplitude of the primary patterns along a perimeter surrounding the acoustic control zone (sound control zone) and/or at one or more predefined locations within the acoustic control zone (sound control zone).

In one example, the acoustic control zone (sound control zone) may include a three-dimensional zone, e.g., defining a volume in which the acoustic energy and/or wave amplitude of one or more of the primary patterns is to be controlled, reshaped, reduced and/or eliminated. According to this example, the AAC system may be configured to control, reshape, reduce and/or eliminate the acoustic energy and/or wave amplitude of the primary patterns on a surface enclosing the three-dimensional volume.

In one example, the acoustic control zone (sound control zone) may include a spherical volume and the AAC system may be configured to control, reshape, reduce and/or eliminate the acoustic energy and/or wave amplitude of the primary patterns on a surface of the spherical volume.

In another example, the acoustic control zone (sound control zone) may include a cubical volume and the AAC system may be configured to control, reshape, reduce and/or eliminate the acoustic energy and/or wave amplitude of the primary patterns on a surface of the cubical volume.

In other aspects, the acoustic control zone (sound control zone) may include any other suitable volume, which may be defined, for example, based on one or more attributes of a location at which the acoustic control zone is to be maintained.

Reference is now made to FIG. 1, which schematically illustrates an AAC system 100, in accordance with some demonstrative aspects.

Figure 2:
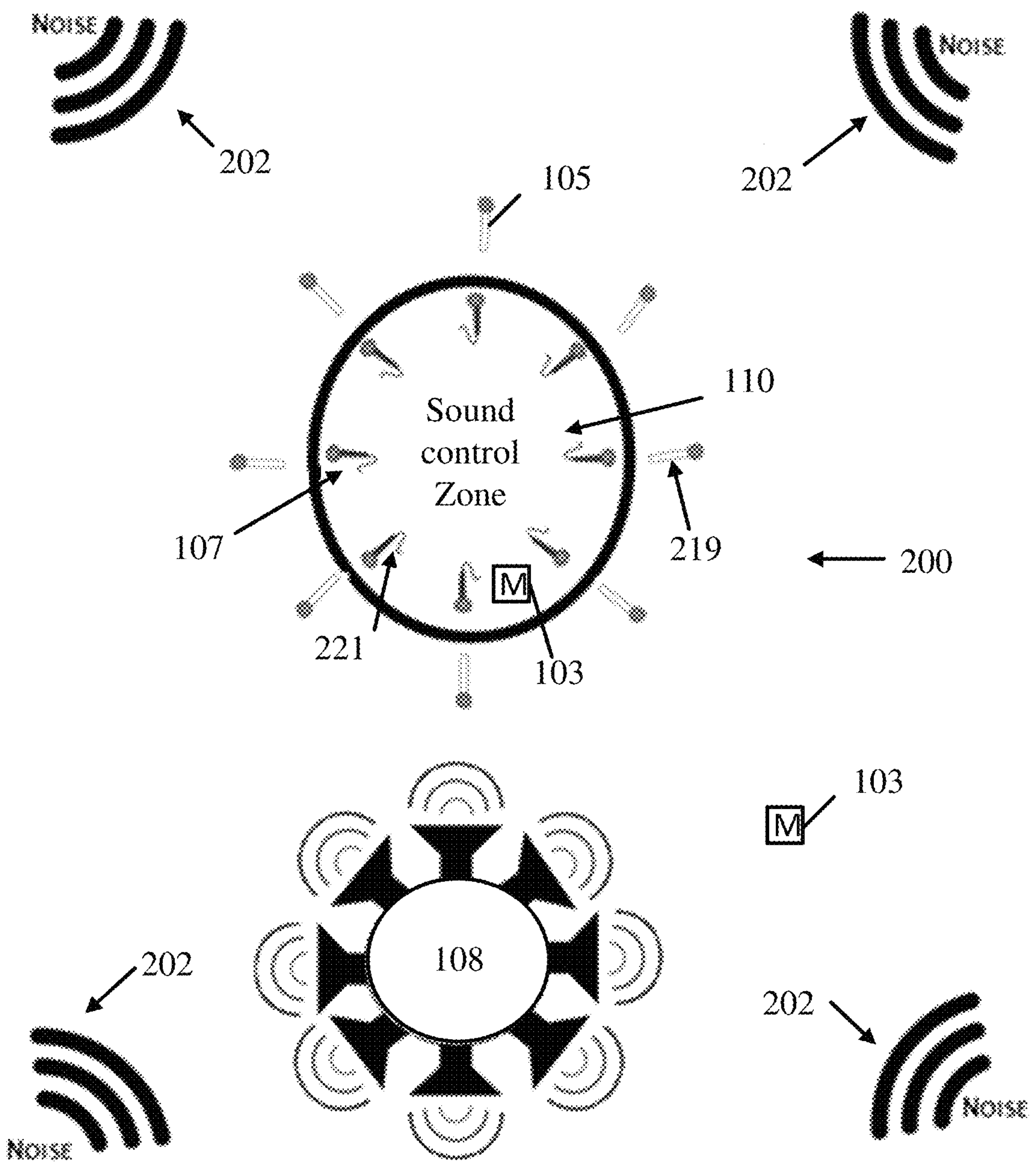
FIG. 2 is a schematic illustration of a deployment scheme of components of the AAC system of FIG. 1, in accordance with some demonstrative aspects.

Reference is also made to FIG. 2, which schematically illustrates a deployment scheme 200 of components of an AAC system, in accordance with some demonstrative aspects. For example, deployment scheme 200 may include a deployment of one or more elements of the AAC system 100 of FIG. 1.

In some demonstrative aspects, AAC system 100 may include, operate as, and/or perform functionalities of, an AAC system, an Active Noise Cancelation (ANC) system, an acoustic control system, a sound control system, a PSB™ system, and/or a Quiet Bubble™ system, e.g., as described below.

In some demonstrative aspects, AAC system 100 may include a controller 102 (also referred to as "AAC controller") configured to control sound within at least one AAC zone (also referred to as "sound-control zone" or "acoustic control zone") 110, e.g., as described in detail below.

In some demonstrative aspects, controller 102 may include, or may be implemented, partially or entirely, by circuitry and/or logic, e.g., one or more processors including circuitry and/or logic, and/or memory circuitry and/or logic. Additionally or alternatively, one or more functionalities of controller 102 may be implemented by logic, which may be executed by a machine and/or one or more processors, e.g., as described below.

In one example, controller 102 may include at least one memory 198, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, at least part of the functionality of controller 102 may be implemented by an integrated circuit, for example, a chip, e.g., a System on Chip (SoC).

In other aspects, controller 102 may be implemented by any other logic and/or circuitry, and/or according to any other architecture.

In some demonstrative aspects, the AAC zone 110 may include an enclosed space, e.g., as described below.

In some demonstrative aspects, the enclosed space may include a cabin of a vehicle, for example, a car, a bus, and/or a truck, e.g., as described below.

In some demonstrative aspects, the enclosed space may include any other cabin, e.g., a cabin of an airplane, a cabin of a train, a cabin of a medical system, an area of a room, and the like.

In other aspects, the enclosed space may include any other enclosed part or area of a space.

In some demonstrative aspects, sound-control zone 110 may be located inside a vehicle, and AAC system 100 may be deployed as part of the vehicle.

In some demonstrative aspects, sound control zone 110 may include a three-dimensional (3D) zone. For example, sound control zone 110 may include a spherical zone.

In another example, sound control zone 110 may include any other 3D zone.

In some demonstrative aspects, AAC system 100 may be configured to control sound and/or noise within zone 110, for example, to provide an improved driving experience for driver and/or one or more passengers of the vehicle, for example, by controlling sound and/or noise within zone 110 in a way which provide an improved music, audio, speech, and/or sound experience within the vehicle, an improved quality of phone conversations, and/or the like.

In some demonstrative aspects, AAC controller 102 may include, or may be implemented with, an input 191, which may be configured to receive input information 195, e.g., as described below.

In some demonstrative aspects, AAC controller 102 may include a controller 193 configured to determine the sound control pattern to control sound within the at least one sound control zone 110 in the vehicle, for example, based on the input information 195, e.g., as described below.

In some demonstrative aspects, the input information 195 may include a plurality of noise inputs 104, e.g., from one or more acoustic sensors (also referred to as "primary sensors", "noise sensors" or "reference sensors") 119, representing acoustic noise at a plurality of predefined noise sensing locations 105, e.g., as described below.

In some demonstrative aspects, AAC controller 102 may receive noise inputs 104 from one or more acoustic sensors 119, which may include one or more physical sensors, e.g., microphones, accelerometers, tachometers and the like, located at one or more of locations 105, and/or one or more virtual sensors configured to estimate the acoustic noise at one or more of locations 105, e.g., as described below.

In some demonstrative aspects, the noise inputs 104 may be based on monitoring information, which may be sensed by one or more monitoring sensors, denoted "M", e.g., microphones, accelerometers, tachometers and the like, at one or more monitoring locations 103, e.g., as described below.

In some demonstrative aspects, a noise input 104 may include a noise input corresponding to a virtual sensor at a virtual sensor location 105. For example, the noise input corresponding to the virtual sensor at a virtual sensor location 105 may be based on monitoring information sensed by one or more sensors at the one or more monitoring locations 103, e.g., as described below.

In some demonstrative aspects, the one or more monitoring locations 103 may include one or more locations different from the noise sensing locations 105, e.g., as described below.

In some demonstrative aspects, as shown in FIG. 2, the monitoring locations 103 may include one or more monitoring locations 103 outside the sound control zone 110, and/or one or more monitoring locations 103 inside the sound control zone 110.

In some demonstrative aspects, the input information 195 may include a plurality of residual-noise inputs 106, e.g., from one or more residual-noise acoustic sensors (also referred to as "error sensors", or "secondary sensors") 121, representing acoustic residual-noise at a plurality of predefined residual-noise sensing locations 107, which are located within sound-control zone 110, e.g., as described below.

In some demonstrative aspects, AAC controller 102 may receive residual-noise inputs 106 from one or more acoustic sensors 121, which may include one or more physical sensors, e.g., microphones, accelerometers tachometers and the like, located at one or more of locations 107, and/or from one or more virtual sensors configured to estimate the residual-noise at one or more of locations 107, e.g., as described below.

In some demonstrative aspects, a residual-noise input 104 may include a residual-noise input corresponding to a virtual sensor at a virtual sensor location 107. For example, the residual-noise input corresponding to the virtual sensor at a virtual sensor location 107 may be based on monitoring information sensed by one or more sensors at the one or more monitoring locations 103, e.g., as described below.

In some demonstrative aspects, AAC system 100 may include at least one acoustic transducer 108, e.g., a speaker, a shaker, and/or any other actuator. For example, AAC controller 102 may control acoustic transducer 108 to generate an acoustic sound control pattern configured to control the sound within sound control zone 110, e.g., as described in detail below.

In some demonstrative aspects, the at least one acoustic transducer 108 may include, for example, an array of one or more acoustic transducers, e.g., at least one suitable speaker, to produce the sound control pattern based on sound control signal 109.

In some demonstrative aspects, the at least one acoustic transducer 108 may be positioned at one or more locations, which may be determined based on one or more attributes of sound control zone 110, e.g., a size and/or shape of zone 110, one or more expected attributes inputs 104, one or more expected attributes of one or more potential actual noise sources 202, e.g., an expected location and/or directionality of noise sources 202 relative to sound control zone 110, a number of noise sources 202, and the like.

In one example, acoustic transducer 108 may include a speaker array including a predefined number, denoted M, of speakers or a multichannel acoustical source. In some demonstrative aspects, acoustic transducer 108 may include an array of speakers implemented using a suitable "compact acoustical source" positioned at a suitable location, e.g., external to zone 110. In another example, the array of speakers may be implemented using a plurality of speakers distributed in space, e.g., around sound control zone 110.

In some demonstrative aspects, one or more of locations 105 may be distributed in any combination of locations on and/or external to the spherical volume, e.g., one or more locations surrounding the spherical volume, e.g., as described below.

In some demonstrative aspects, one or more locations 105 may be distributed externally to sound control zone 110. For example, one or more of locations 105 may be distributed on, or in proximity to, an envelope or enclosure surrounding sound control zone 110.

For example, if sound control zone 110 is defined by a spherical volume, then one or more of locations 105 may be distributed on a surface of the spherical volume and/or external to the spherical volume.

In some demonstrative aspects, locations 107 may be distributed within sound control zone 110, for example, in proximity to the envelope of sound control zone 110.

For example, if zone 110 is defined by a spherical volume, then locations 107 may be distributed on a spherical surface having a radius, which is lesser than a radius of sound control zone 110.

In some demonstrative aspects, AAC system 100 may include one or more first acoustic sensors ("primary sensors") 119 to sense the acoustic noise at one or more of the plurality of noise sensing locations 105.

In some demonstrative aspects, AAC system 100 may include one or more second acoustic sensors ("error sensors") 121 to sense the acoustic residual-noise at one or more of the plurality of residual-noise sensing locations 107.

In some demonstrative aspects, one or more of the error sensors and/or one or more of the primary sensors may be implemented using one or more "virtual sensors" ("virtual microphones"). A virtual microphone corresponding to a particular microphone location may be implemented by any suitable algorithm and/or method capable of evaluating an acoustic pattern, which would have been sensed by an actual acoustic sensor located at the particular microphone location.

In some demonstrative aspects, AAC controller 102 may be configured to simulate and/or perform the functionality of the virtual microphone, e.g., by estimating and/or evaluating the acoustic noise pattern at the particular location of the virtual microphone.

In some demonstrative aspects, an AAC system e.g., AAC system 100 (FIG. 1), may include a first array 219 of one or more primary sensors, e.g., microphones, accelerometers, tachometers and the like, configured to sense the primary patterns at one or more of locations 105. For example, array 219 may include a plurality of acoustic sensors 119 (FIG. 1). For example, array 219 may include a microphone to output a noise signal 104 (FIG. 1) including, for example, a sequence of N samples per second. For example, N may be 48000 samples per second, e.g., if the microphone operates at a sampling rate of about 48 KHz. The noise signal 104 (FIG. 1) may include any other suitable signal having any other suitable sampling rate and/or any other suitable attributes.

In some demonstrative aspects, one or more of the sensors of array 219 may be implemented using one or more "virtual sensors". For example, array 219 may be implemented by a combination of at least one microphone and at least one virtual microphone. A virtual microphone corresponding to a particular microphone location of locations 105 may be implemented by any suitable algorithm and/or method, e.g., as part of controller 102 (FIG. 1) or any other element of system 100 (FIG. 1), capable of evaluating an acoustic pattern, which would have been sensed by an acoustic sensor located at the particular microphone location. For example, controller 102 (FIG. 1) may be configured to evaluate the acoustic pattern of the virtual microphone based on at least one actual acoustic pattern sensed by the at least one microphone 119 (FIG. 1) of array 219.

In some demonstrative aspects, AAC controller 102 may be configured to simulate and/or perform the functionality of a virtual primary sensor at a primary sensor location 105, for example, based on monitoring information sensed by the one or more monitoring sensors at the one or more monitoring locations 103.

In some demonstrative aspects, AAC system 100 (FIG. 1) may include a second array 221 of one or more error sensors, e.g., microphones, configured to sense the acoustic residual-noise at one or more of locations 107. For example, array 221 may include a plurality of acoustic sensors 121 (FIG. 1). For example, the error sensors may include one or more sensors to sense the acoustic residual-noise patterns on a spherical surface within spherical sound control zone 110.

In some demonstrative aspects, one or more of the sensors of array 221 may be implemented using one or more "virtual sensors". For example, array 221 may include a combination of at least one microphone and at least one virtual microphone. A virtual microphone corresponding to a particular microphone location of locations 107 may be implemented by any suitable algorithm and/or method, e.g., as part of controller 102 (FIG. 1) or any other element of system 100 (FIG. 1), capable of evaluating an acoustic pattern, which would have been sensed by an acoustic sensor located at the particular microphone location. For example, controller 102 (FIG. 1) may be configured to evaluate the acoustic pattern of the virtual microphone based on at least one actual acoustic pattern sensed by the at least one microphone 121 (FIG. 1) of array 221.

In some demonstrative aspects, AAC controller 102 may be configured to simulate and/or perform the functionality of a virtual primary sensor at an error sensor location 107, for example, based on monitoring information sensed by the one or more monitoring sensors at the one or more monitoring locations 103.

In some demonstrative aspects, the number, location and/or distribution of the locations 103, 105 and/or 107, and/or the number, location and/or distribution of one or more acoustic sensors at one or more of locations 103, 105 and 107 may be determined based on a size of sound control zone 110 and/or of an envelope of sound control zone 110, a shape of sound control zone 110 or of the envelope of sound control zone 110, one or more attributes of the acoustic sensors to be located at one or more of locations 103, 105 and/or 107, e.g., a sampling rate of the sensors, and the like.

In one example, one or more acoustic sensors, e.g., microphones, accelerometers, tachometers and the like, may be deployed at locations 103, 105 and/or 107 according to the Spatial Sampling Theorem, e.g., as defined below by Equation 1.

For example, a number of the primary sensors, a distance between the primary sensors, a number of the error sensors and/or a distance between the error sensors may be determined in accordance with the Spatial Sampling Theorem, e.g., as defined below by Equation 1.

In one example, the primary sensors and/or the error sensors may be distributed, e.g., equally or non-equally distributed, with a distance, denoted d, from one another. For example, the distance d may be determined as follows:

$$d \leq \frac{C}{2 \cdot f} \tag{1}$$

wherein c denotes the speed of sound and $f_{max}$ denotes a maximal frequency at which sound control is desired.

For example in case the maximal frequency of interest is $f_{max}$=100 [HZ], the distance d may be determined as $$d \leq \frac{343}{2 \cdot 100} = 1.71[m].$$

As shown in FIG. 2 deployment scheme 200 is configured with respect to a circular or spherical sound control zone 110. For example, one or more locations 105 are distributed, e.g., substantially evenly distributed, in a spherical or circular manner around sound control zone 110, and locations 107 are distributed, e.g., substantially evenly distributed, in a spherical or circular manner within sound control zone 110.

However in other aspects, components of AAC system 100 may be deployed according to any other deployment scheme including any suitable distribution of locations 105 and/or 107, e.g., configured with respect a sound control zone of any other suitable form and/or shape.

In some demonstrative aspects, AAC controller 102 may be configured to determine the sound control pattern to be reduced according to at least one noise parameter, e.g., energy, amplitude, phase, frequency, direction, and/or statistical properties within sound control zone 110, e.g., as described in detail below.

In some demonstrative aspects, AAC controller 102 may determine the sound control pattern to selectively reduce one or more predefined first noise patterns within sound control zone 110, while not reducing one or more second noise patterns within sound control zone 110, e.g., as described below.

In some demonstrative aspect, sound control zone 110 may be located within an interior of a vehicle, and AAC controller 102 may determine the sound control pattern to selectively reduce one or more first noise patterns, e.g., including a road noise pattern, a wind noise pattern, and/or an engine noise pattern, while not reducing one or more second noise patterns, e.g., including an audio noise pattern of an audio device located within the vehicle, a horn noise pattern, a siren noise pattern, a hazard noise pattern of a hazard, an alarm noise pattern of an alarm signal, a noise pattern of an informational signal, and the like.

In some demonstrative aspects, AAC controller 102 may determine the sound control pattern, e.g., even without having information relating to one or more noise-source attributes of one or more of actual noise sources 202 generating the acoustic noise at the noise sensing locations 105.

For example, the noise-source attributes may include a number of noise sources 202, a location of noise sources 202, a type of noise sources 202 and/or one or more attributes of one or more noise patterns generated by one or more of noise sources 202.

In some demonstrative aspects, AAC controller 102 may be configured to determine the sound control pattern, for example, while taking into account one or more factors, for example, one or more acoustic transfer-functions between elements of AAC system 100, e.g., acoustic transfer-functions between the at least one acoustic transducer 108 and one or more residual-noise sensors 121; and/or statistical characteristics of noise to be handled by the AAC system 100, e.g., as described below.

In other aspects, AAC controller 102 may be configured to determine the sound control pattern based on any other additional or alternative factors, criteria, attributes, and/or parameters.

In some demonstrative aspects, the acoustic transfer-functions may represent and/or describe an acoustic medium through which the sound waves travel. For example, a transfer-function between a source point and a destination point may include a direct path, e.g., defined by a straight line (if exists) connecting the source point and the destination point, and/or one or more multipaths, e.g., indirect paths which contain reflections from objects in the environment surrounding the source point and the destination point.

In some demonstrative aspects, the statistical characteristics of noise to be handled by the AAC system 100 may be based on the spectral distribution of the noise signals, e.g., how the energy of a noise signal is distributed across a pertinent frequency range.

In some demonstrative aspects, the acoustic transfer functions in a vehicle environment may be prone to physical changes of the vehicle environment, such as, for example, positions and/or angles of the vehicle seats, the number of passengers within the vehicle, one or more open/closed windows, and/or any other additional or alternative attribute of the vehicle environment.

In some demonstrative aspects, the spectral distribution of the noise signals in a vehicle environment may be sensitive to one or more factors including, for example, a road surface, a type of the vehicle tires, a velocity of the vehicle, an engine speed (RPM) of the vehicle, wind induced noise, operation of an air conditioning system in the vehicle, and/or one or more additional or alternative factors.

In some demonstrative aspects, AAC controller 102 may be configured to adapt the sound control pattern, for example, based on one or more changes in the transfer functions and/or the spectral distribution of the noise, for example, to adapt an operation of the AAC system 100 to the new conditions.

In some demonstrative aspects, AAC controller 102 may be configured to adjust parameters of the AAC system 100, for example, in real-time and/or in a continuous manner, for example, in a manner which may address one or more technical issues.

In one example, continuous adaptation of the parameters of the AAC system 100 may be sensitive to abrupt changes in the transfer function and/or the spectral distribution of the noise.

In another example, continuous adaptation of the parameters of the AAC system 100 may be slower than the change itself, which may lead to short times in which the noise reduction is corrupted.

In some demonstrative aspects, AAC controller 102 may include, and/or may be configured to perform the functionality of, a state-machine, which may receive input from one or more sources, e.g., an in-vehicle computer and/or from one or more detectors, which may monitor one or more environmental conditions, e.g., as described below.

In one example, the input from the one or more sources may include, for example, information indicative of a position of the vehicle seats, the number of passengers, the velocity of the vehicle, the engine speed, and/or the like, e.g., as described below.

In another example, the input from the one or more sources may include, for example, information indicative of the temperature and/or pressure in the cabin of the vehicle.

In some demonstrative aspects, AAC controller 102 may be configured to determine a mode of operation of the AAC system 100, for example, by programing the AAC system 100 with an adequate set of parameters, e.g., as described below.

In some demonstrative aspects, AAC controller 102 may include, and/or may be configured to perform the functionality of, an AAC adapter. For example, the AAC adapter may receive a set of parameters from the state-machine. For example, the AAC adapter may adapt, e.g., continuously adapt, the set of parameters based on one or more criteria, for example, to minimize residual noise measured by an array of error monitoring microphones 121, which may be located, for example, near by the occupant's ears on the seat or on the headrest, e.g., as described below.

In some demonstrative aspects, the state-machine may be configured to handle changes in the acoustic transfer functions, and the AAC adapter may be responsible of handling changes in the spectral distribution of the noise, e.g., as described below.

In some demonstrative aspects, the state-machine may support the adaptive AAC, for example, by leveraging its monitoring capabilities, e.g., in-vehicle computer and/or detector of environmental conditions, to tune the adaptive AAC, e.g., as described below.

In some demonstrative aspects, the input information 195 may include AAC information 129 (also referred to as "AAC support information", "AAC assistance information", or "AAC configuration information"), which may be received from one or more information sources 120, e.g., including one or more information sources in the vehicle, e.g., as described below.

In some demonstrative aspects, controller 193 may be configured to receive and process the AAC information 129, for example, via input 191, e.g., as described below.

In some demonstrative aspects, controller 193 may be configured to determine the sound control signal 109, for example, based on AAC information 129, for example, in addition to noise inputs 104 and/or residual-noise inputs 106, e.g., as described below.

In some demonstrative aspects, the AAC information 129 may include information corresponding to a configuration of AAC in the sound control zone 110, e.g., as described below.

In some demonstrative aspects, the AAC information 129 may include information of one or more parameters and/or attributes affecting an AAC configuration corresponding to the sound control zone 110, e.g., as described below.

In some demonstrative aspects, the AAC assistance information 129 may include information, which may be utilized by AAC controller 193, for example, to assist AAC controller 193, in configuration of one or more AAC settings and/or AAC parameters, e.g., as described below.

In some demonstrative aspects, the AAC assistance information 129 may include real-time input information, which may be received from the one or more information sources 120 in real-time, for example, during operation of the AAC system 100, e.g., as described below.

In some demonstrative aspects, the AAC configuration information 129 may include real-time information corresponding to a real-time acoustic configuration of the sound control zone 110, e.g., as described below.

In some demonstrative aspects, the AAC information 129 may include information, which may correspond to, may represent, and/or may affect, one or more sound control parameters of a sound control setting of the sound control zone 110, e.g., as described below.

In some demonstrative aspects, the AAC information 129 may include acoustic configuration information corresponding to an acoustic configuration of the sound control zone 110, e.g., as described below.

In some demonstrative aspects, the AAC assistance information 129 may include acoustic configuration information, for example, including information related to one or more parameters of the acoustic configuration of the sound control zone 110, e.g., as described below.

In some demonstrative aspects, the AAC information 129 may include acoustic configuration information, for example, including information defining one or more parameters of the acoustic configuration of the sound control zone 110, e.g., as described below.

In some demonstrative aspects, the AAC information 129 may include acoustic configuration information, for example, including information affecting one or more parameters of the acoustic configuration of the sound control zone 110, e.g., as described below.

In some demonstrative aspects, the AAC assistance information 129 may include acoustic configuration information, for example, including information representing one or more parameters of the acoustic configuration of the sound control zone 110, e.g., as described below.

In some demonstrative aspects, the AAC assistance information 129 may include information corresponding to an AAC configuration affecting a sound control zone 110 implemented in a vehicle, e.g., as described below.

In some demonstrative aspects, the AAC assistance information 129 may include vehicular system configuration information corresponding to a configuration of a mode of operation of one or more vehicular systems of a vehicle including the sound control zone 110, e.g., as described below.

In some demonstrative aspects, the AAC assistance information 129 may include vehicular sensor information from one or more vehicular sensors of a vehicle including the sound control zone, e.g., as described below.

In some demonstrative aspects, the AAC assistance information 129 may include vehicle speed information corresponding to a speed of a vehicle including the sound control zone 110, e.g., as described below.

In some demonstrative aspects, the AAC assistance information 129 may include engine information corresponding to an engine of a vehicle including the sound control zone 110, e.g., as described below.

In some demonstrative aspects, the AAC assistance information 129 may include braking system information corresponding to a braking system of a vehicle including the sound control zone 110, e.g., as described below.

In some demonstrative aspects, the AAC assistance information 129 may include road detection information from a road detection system of a vehicle including the sound control zone 110, e.g., as described below.

In some demonstrative aspects, the AAC assistance information 129 may include steering information corresponding to a steering system of a vehicle including the sound control zone 110, e.g., as described below.

In some demonstrative aspects, the AAC assistance information 129 may include tire information corresponding to one or more tires of a vehicle including the sound control zone 110, e.g., as described below.

In some demonstrative aspects, the AAC assistance information 129 may include seat position information corresponding to one or more seats of a vehicle including the sound control zone 110, e.g., as described below.

In some demonstrative aspects, the AAC assistance information 129 may include passenger information corresponding to one or more passengers of a vehicle including the sound control zone 110, e.g., as described below.

In some demonstrative aspects, the AAC assistance information 129 may include opening-state information corresponding to a state of an opening of a vehicle including the sound control zone 110, e.g., as described below.

In some demonstrative aspects, the AAC assistance information 129 may include audio-system information corresponding to an audio-system of a vehicle including the sound control zone 110, e.g., as described below.

In some demonstrative aspects, the AAC assistance information 129 may include climate information corresponding to at least one of a climate inside the sound control zone 110 or a climate outside the sound control zone 110, e.g., as described below.

In some demonstrative aspects, the AAC assistance information 129 may include user position information corresponding to a position of at least one of a head or an ear of a user in the sound control zone 110, e.g., as described below.

In some demonstrative aspects, the AAC assistance information 129 may include user identity information corresponding to an identity of a user to control a user preference with respect to the sound control zone 110, e.g., as described below.

In one example, the AAC assistance information 129 may include user identity information corresponding to an identity of a user of the sound control zone 110. For example, the AAC assistance information 129 may include user identity information corresponding to an identity of a driver of a vehicle, for example, to control a user preference with respect to the sound control zone 110 implemented with respect to a driver seat of the vehicle.

In another example, the AAC assistance information 129 may include user identity information corresponding to an identity of a user to control a user preference with respect to the sound control zone 110, which may be used by another user. For example, the AAC assistance information 129 may include user identity information corresponding to an identity of a driver of a vehicle, for example, to control a user preference with respect to the sound control zone 110 implemented with respect to one or more passenger seats of the vehicle.

In some demonstrative aspects, the AAC assistance information 129 may include acoustic configuration information, for example, including any other additional or alternative information, which may be related to the acoustic configuration of the sound control zone 110, e.g., as described below.

In some demonstrative aspects, input 191 may be configured to receive the AAC information 129 via a communication bus of a vehicle including the sound control zone 110, e.g., as described below.

In some demonstrative aspects, input 191 may be configured to receive the AAC assistance information 129 via Controller Area Network (CAN) bus information received via a CAN bus of the vehicle.

In some demonstrative aspects, input 191 may be configured to receive the AAC assistance information 129 via A to B (A2B) bus information received via an A2B bus of the vehicle.

In some demonstrative aspects, input 191 may be configured to receive the AAC assistance information 129 via Media Oriented Systems Transport (MOST) bus information received via a MOST bus of the vehicle.

In some demonstrative aspects, input 191 may be configured to receive the AAC assistance information 129 via wireless communication information received over a wireless communication link.

In some demonstrative aspects, input 191 may be configured to receive the AAC assistance information 129 via Ethernet bus information received via an Ethernet bus of the vehicle.

In other aspects, input 191 may be configured to receive the AAC information 129 via any other wired link or connection, wireless link or connection, and/or any other communication mechanism, connection, link, bus and/or interface.

In some demonstrative aspects, the AAC information 129 may include sensor information from one or more sensors, e.g., as described below. For example, information sources 120 may include one or more sensors, e.g., as described below.

In some demonstrative aspects, the AAC assistance information 129 may include sensor information from one or more acoustic sensors, e.g., as described below. For example, information sources 120 may include one or more acoustic sensors, e.g., as described below.

In some demonstrative aspects, information sources 120 may include one or more acoustic sensors, which may be different from, and/or independent of, the monitoring sensors at monitoring locations 103, noise acoustic sensors 119, and/or the residual-noise acoustic sensors 121, e.g., as described below.

In some demonstrative aspects, information sources 120 may include one or more acoustic sensors, which may be included as part of, and/or may utilize one or more functionalities of, the monitoring sensors at monitoring locations 103, the noise acoustic sensors 119 and/or the residual-noise acoustic sensors 121, e.g., as described below.

In some demonstrative aspects, the AAC information 129 may be based, partially or entirely, on acoustic information from one or more of the noise acoustic sensors 104 and/or the residual-noise acoustic sensors 121, e.g., as described below.

In some demonstrative aspects, information sources 120 may include one or more environment sensors, which may be configured to sense one or more parameters and/or an attribute of an environment of the sound control zone 110, e.g., as described below.

In some demonstrative aspects, for example, the environment sensors may include acoustic sensors, image sensors, optic sensors, light sensors, temperature sensors, accelerometers, pressure sensors, humidity sensors, and/or any other type of sensor.

In some demonstrative aspects, the AAC information 129 may include sensor information from one or more optic and/or image sensors, e.g., as described below. For example, information sources 120 may include one or more optic and/or image sensors, for example, cameras, e.g., as described below.

In some demonstrative aspects, the AAC information 129 may include any other sensor information from any other additional or alternative sensor.

In some demonstrative aspects, information sources 120 may include one or more state information sources, which may be configured to provide the AAC information 129 corresponding to a state of one or more elements and/or settings affecting an AAC configuration, e.g., as described below.

In some demonstrative aspects, the AAC information 129 may include vehicular system configuration information corresponding to the configuration of an operation of one or more vehicular systems of the vehicle, e.g., as described below.

In some demonstrative aspects, the AAC information 129 may include vehicular system configuration information from one or more vehicular systems of the vehicle, e.g., as described below. For example, information sources 120 may include one or more vehicular systems of the vehicle, and/or a system controller of the vehicle, e.g., as described below.

In some demonstrative aspects, AAC information 129 may include vehicle sensor information, which may be received from one or more sensors of the vehicular systems of the vehicle, e.g., as described below.

In some demonstrative aspects, AAC information 129 may include vehicle speed information corresponding to a speed of the vehicle, e.g., as described below.

In some demonstrative aspects, AAC information 129 may include engine information corresponding to an engine of the vehicle, e.g., as described below.

For example, AAC information 129 may include Revolutions Per Minute (RPM) information corresponding to an RPM of the engine of the vehicle, e.g., as described below.

In some demonstrative aspects, AAC information 129 may include braking system information corresponding to a braking system of the vehicle, e.g., as described below.

For example, AAC information 129 may include braking system information to indicate an operational state of a main braking system, an emergency braking system, and/or an Anti-lock braking system (ABS), and/or any other braking system, e.g., as described below.

In some demonstrative aspects, AAC information 129 may include road detection information corresponding to a road detection system of the vehicle, e.g., as described below.

For example, AAC information 129 may include road detection information to indicate a road type, for example, a smooth road, a bumpy road, a rough road, a highway, a paved road, a dirt road, a gravel road, or the like, e.g., as described below.

In some demonstrative aspects, AAC information 129 may include steering information corresponding to a steering system of the vehicle, e.g., as described below.

For example, AAC information 129 may include steering wheel information to indicate an angle of a steering wheel of the vehicle, e.g., as described below.

In some demonstrative aspects, AAC information 129 may include tire information corresponding to a tire system of the vehicle, e.g., as described below.

For example, AAC information 129 may include tire pressure information to indicate pressure of one or more tires of the vehicle, and/or tire type information to indicate a type and/or size of one or more tires of the vehicle, e.g., as described below.

In some demonstrative aspects, AAC information 129 may include seat position information corresponding to a positioning of one or more seats in the vehicle, e.g., as described below.

For example, AAC information 129 may include seat position information corresponding to a positioning of a driver seat and/or a positioning of one or more passenger seats in the vehicle, e.g., as described below.

In some demonstrative aspects, AAC information 129 may include passenger information corresponding to one or more passengers in the vehicle, e.g., as described below.

For example, AAC information 129 may include passenger information to indicate a count, a position, a location, a size, and/or measurements of one or more passengers in the vehicle, e.g., as described below.

In some demonstrative aspects, AAC information 129 may include opening state information corresponding to one or more openings of the vehicle, e.g., as described below.

In some demonstrative aspects, AAC information 129 may include window/roof information corresponding to a window, a door, a trunk, and/or a roof of the vehicle, e.g., as described below.

For example, AAC information 129 may include window information to indicate a fully open position of one or more windows, a partially open position, how much a window is open (e.g., % window open), or a closed position of one or more windows; door information to indicate an open door or a closed door; and/or roof information to indicate a roof type, e.g., a metal roof or a panoramic roof, a roof position, for example, an open position, a partially open position, how much a roof is open (e.g., % roof open), or a closed position of a roof of the vehicle, e.g., as described below.

In some demonstrative aspects, AAC information 129 may include audio system information corresponding to an audio system of the vehicle, e.g., as described below.

For example, AAC information 129 may include audio system information to indicate one or more audio parameters of an operation of the audio system, for example, an audio level, an audio input, an equalizer setting, a music level, or the like, e.g., as described below.

In some demonstrative aspects, AAC information 129 may include climate information corresponding to a climate inside the vehicle and/or a climate outside the vehicle, e.g., as described below.

For example, AAC information 129 may include temperature information corresponding to a temperature inside the vehicle and/or a temperature outside the vehicle, e.g., as described below.

For example, AAC information 129 may include humidity information corresponding to humidity inside the vehicle and/or humidity outside the vehicle, e.g., as described below.

For example, AAC information 129 may include precipitation information corresponding to a situation of rain, snow and/or ice outside the vehicle, e.g., as described below.

In some demonstrative aspects, AAC information 129 may include any other additional or alternative information.

In some demonstrative aspects, controller 193 may be configured to determine the sound control pattern to control sound within the sound control zone 110, for example, based on the AAC information 129, the plurality of noise inputs 104 and the plurality of residual-noise inputs 106, e.g., as described below.

In some demonstrative aspects, AAC controller 102 may include an output 197 to output the sound control pattern to a plurality of acoustic transducers. For example, output 197 may be configured to output the sound control pattern in the form of sound control signal 109 to control acoustic transducer 108, e.g., as described below.

In some demonstrative aspects, AAC controller 102 may be configured to determine an AAC parameter setting based on the AAC configuration information 129, and to determine the sound control pattern for sound control signal 109, for example, by applying the AAC parameter setting to at least one of the plurality of noise inputs 104, and/or the plurality of residual-noise inputs 106, e.g., as described below.

In some demonstrative aspects, AAC controller 102 may be configured to adapt, e.g., dynamically adapt, adapt offline, and/or adapt in real time, the AAC parameter setting, for example, based on a change in the AAC configuration information 129, e.g., as described below.

In some demonstrative aspects, AAC controller 102 may be configured to determine a prediction filter setting of at least one prediction filter based, for example, on the AAC configuration information 129, and to determine the sound control pattern based, for example, on the prediction filter setting, e.g., as described below.

In some demonstrative aspects, the prediction filter setting may include, for example, a prediction filter weight vector to be applied by the prediction filter for determining the sound control pattern for sound control signal 109, for example, based on at least one of the plurality of noise inputs 104 and/or the plurality of residual-noise inputs 106, e.g., as described below.

In some demonstrative aspects, prediction filter setting may include an update rate parameter for updating the prediction filter weight vector, e.g., as described below.

In other aspects, the AAC controller 102 may be configured to determine any other additional or alternative prediction filter setting based, for example, on the AAC configuration information 129.

In some demonstrative aspects, AAC controller 102 may be configured to determine a path transfer function setting of one or more path transfer functions based, for example, on the AAC configuration information 129, and to apply the path transfer function setting for determining the sound control pattern for sound control signal 109, for example, based on at least one of the plurality of noise inputs 104 and/or the plurality of residual-noise inputs 106, e.g., as described below.

In some demonstrative aspects, the path transfer function setting may include a setting of a path transfer function between an acoustic transducer 108 and a noise sensing location 105, e.g., as described below.

In some demonstrative aspects, the path transfer function setting may include a setting of a path transfer function between an acoustic transducer 108 and a residual-noise sensing location 107, e.g., as described below.

In some demonstrative aspects, the path transfer function setting may include a setting of a path transfer function between an acoustic transducer 108 and a monitoring location 103. For example, at least one of the one or more residual-noise inputs 106 may be based, for example, on a monitoring input sensed at the monitoring location 103.

For example, the AAC controller 102 may be configured to determine a setting of a path transfer function between an acoustic transducer 108 and a monitoring location 103 of a monitoring sensor, which is used to determine a residual-noise input 106.

For example, the AAC controller 102 may be configured to determine the sound control pattern to control sound within the sound control zone 110, for example, based on the setting of the path transfer function between the acoustic transducer 108 and the monitoring location 103 of the monitoring sensor.

In one example, the monitoring location 103 of the monitoring sensor, which is used to determine the residual-noise input 106 may be in the sound control zone 110.

In another example, the monitoring location 103 of the monitoring sensor, which is used to determine the residual-noise input 106 may be outside of the sound control zone 110.

In some demonstrative aspects, AAC controller 102 may be configured to determine a noise extraction function based, for example, on the AAC configuration information, e.g., as described below.

In some demonstrative aspects, AAC controller 102 may be configured to determine one or more extracted acoustic patterns, for example, by applying the noise extraction function to at least one of the plurality of noise inputs 104 and/or the plurality of residual-noise inputs 106, and to determine the sound control pattern for sound control signal 109, for example, based on the one or more extracted acoustic patterns, e.g., as described below.

In some demonstrative aspects, AAC controller 102 may be configured to determine a sound control profile based on the AAC configuration information 129, and to determine the sound control pattern based on the sound control profile, e.g., as described below.

In some demonstrative aspects, the sound control profile may include a setting of one or more sound control parameters, and the AAC controller 102 may be configured to determine the sound control pattern for sound control signal 109, for example, based on the setting of the one or more sound control parameters according to the sound control profile, e.g., as described below.

In some demonstrative aspects, memory 198 may be configured, e.g., by controller 193, to store a plurality of sound control profiles corresponding to a plurality of sound control configurations, e.g., as described below.

In some demonstrative aspects, controller 193 may be configured to select and retrieve from the plurality of sound control profiles in memory 198 a selected sound control profile based, for example, on the AAC configuration information 129, e.g., as described below.

In some demonstrative aspects, controller 193 may be configured to determine the sound control pattern for sound control signal 109, for example, based on the selected sound control profile, e.g., as described below.

In some demonstrative aspects, the plurality of sound control profiles may include one or more user-based profiles corresponding to one or more users, e.g., as described below.

In some demonstrative aspects, the user-based profile corresponding to a user may include, for example, a setting of one or more sound control parameters based on a preference of the user, e.g., as described below.

In some demonstrative aspects, the user-based profile may correspond to a user, which may be allowed to control a user preference with respect to the sound control zone 110, e.g., as described below.

In one example, a user-based profile may correspond to a user of the sound control zone 110. For example, a user-based profile of a driver of a vehicle may include, for example, a setting of one or more sound control parameters based on a preference of the driver with respect to the sound control zone 110 implemented with respect to a driver seat of the vehicle.

In another example, a user-based profile may correspond to a first user to control a user preference with respect to the sound control zone 110, which may be used by a second user. For example, the user-based profile of the driver of the vehicle may include, for example, a setting of one or more sound control parameters based on a preference of the driver with respect to the sound control zone 110 implemented with respect to one or more passenger seats of the vehicle.

In some demonstrative aspects, the AAC configuration information 129 may include, for example, user identity information corresponding to an identity of the user. For example, controller 193 may be configured to select and retrieve from the plurality of sound control profiles in memory 198 a selected sound control profile based, for example, on the user identity information in AAC configuration information 129.

In some demonstrative aspects, AAC controller 102 may be configured to selectively mute the sound control pattern for sound control signal 109, for example, based on the AAC configuration information 129, e.g., as described below.

In some demonstrative aspects, AAC controller 102 may be configured to adjust a level of the sound control pattern for sound control signal 109, for example, based on the AAC configuration information 129, e.g., as described below.

In some demonstrative aspects, AAC controller 102 may be configured to freeze an adaptation of the sound control pattern for sound control signal 109, for example, based on the AAC configuration information 129, e.g., as described below.

In some demonstrative aspects, AAC controller 102 may be configured to determine setting of at least one AAC parameter, for example, based on the AAC information 129, and to determine the sound control pattern for sound control signal 109, for example, based on the AAC parameter setting, e.g., as described below.

In some demonstrative aspects, the AAC parameter setting may include a setting of a prediction filter, a setting of a path transfer function, a setting of an adaptive AAC parameter, a setting of an extractor (also referred to as "acoustic pattern extractor") to extract a plurality of disjoint reference acoustic patterns, and/or a setting of any other parameter, which may be utilized for determining, generating, updating, configuring, and/or adapting the sound control pattern to control acoustic transducer 108, e.g., as described below.

In some demonstrative aspects, AAC controller 102 may be configured to determine a prediction filter setting of at least one prediction filter based on the AAC information 129, and to determine the sound control pattern for sound control signal 109, for example, based on the prediction filter setting, e.g., as described below.

In some demonstrative aspects, the prediction filter setting may include a prediction filter weight vector to be applied by the prediction filter for determining the sound control pattern based on the plurality of noise inputs 104 and the plurality of residual-noise inputs 106, e.g., as described below.

In some demonstrative aspects, the prediction filter setting may include an update rate parameter for updating the prediction filter weight vector, e.g., as described below.

In some demonstrative aspects, AAC controller 102 may be configured to determine a path transfer function setting of one or more path transfer functions based on the AAC information 129, and to apply the path transfer function setting for determining the sound control pattern for sound control signal 109, for example, based on the plurality of noise inputs 104 and the plurality of residual-noise inputs 106, e.g., as described below.

In some demonstrative aspects, AAC controller 102 may be configured to determine a path transfer function setting of a path transfer function between acoustic transducer 108 and a noise sensing location 105, e.g., as described below.

In some demonstrative aspects, AAC controller 102 may be configured to determine a path transfer function setting of a path transfer function between acoustic transducer 108 and a residual-noise sensing location 107, e.g., as described below.

In some demonstrative aspects, AAC controller 102 may be configured to extract from the plurality of noise inputs 104 a plurality of disjoint reference acoustic patterns, which are statistically independent, and/or to extract from residual-noise inputs 106 a plurality of disjoint residual-noise acoustic patterns, which are statistically independent.

For example, controller 193 may include an extractor (also referred to as "acoustic pattern extractor" or "feature extractor") to extract the plurality of disjoint reference acoustic patterns and/or the plurality of disjoint residual-noise acoustic patterns.

The phrase "disjoint acoustic patterns" as used herein may refer to a plurality of acoustic patterns, which are independent with respect to at least one feature and/or attribute, e.g., energy, amplitude, phase, frequency, direction, one or more statistical signal properties, and the like.

In some demonstrative aspects, controller 193 may extract the plurality of disjoint reference acoustic patterns by applying a predefined reference-noise extraction function to the plurality of reference noise inputs 104.

In some demonstrative aspects, the extraction of the disjoint acoustic patterns may be used, for example, to model the primary pattern of inputs 104 as a combination of the predefined number of disjoint acoustic patterns, e.g., corresponding to a respective number of disjoint modeled acoustic sources.

In one example, it may be expected that one or more expected noise patterns, which are expected to affect sound control zone 110, may be generated by one or more of road noise, wind noise, engine noise and the like. Accordingly, controller 193 may be configured to select one or more reference acoustic patterns based on one or more attributes of the road noise pattern, the wind noise pattern, the engine noise pattern, and/or any other noise pattern.

In some demonstrative aspects, controller 193 may extract the plurality of disjoint residual-noise acoustic patterns by applying a predefined residual-noise extraction function to the plurality of residual-noise inputs 106.

In some demonstrative aspects, AAC controller 102 may be configured to determine an acoustic pattern extractor setting of the acoustic pattern extractor based on the AAC information 129, and to determine the sound control pattern for sound control signal 109, for example, based on the acoustic pattern extractor setting, e.g., as described below.

In some demonstrative aspects, the acoustic pattern extractor setting may include one or more acoustic pattern extractor coefficients to be applied by the acoustic pattern extractor for determining the plurality of disjoint reference acoustic patterns and/or the plurality of disjoint residual-noise acoustic patterns, e.g., as described below.

In some demonstrative aspects, the acoustic pattern extractor setting may include an update rate parameter for updating the one or more coefficients of the acoustic pattern extractor, e.g., as described below.

In some demonstrative aspects, controller 193 may be configured to determine, update, and/or adjust, e.g., in real-time, a setting of at least one acoustic pattern extractor parameter based on the AAC information 129, and to determine the sound control pattern for sound control signal 109, for example, based on the acoustic pattern extractor parameter setting, e.g., as described below.

In some demonstrative aspects, the acoustic pattern extractor parameter setting may include a setting of one or more coefficients, one or more weight parameters, one or more update rate parameters, one or more adaptation parameters, and/or any other parameters, which may be utilized by the acoustic pattern extractor in extracting the plurality of disjoint reference acoustic patterns and/or the plurality of disjoint residual-noise acoustic patterns.

In some demonstrative aspects, the AAC information 129 may include passenger tracking information to indicate a position of a head and/or an ear of a passenger.

For example, the information sources 120 may include a camera, an image sensor, an optical sensor, and/or any other sensor, which may be configured to trach the position of the head and/or ears of the passenger. For example, AAC controller 102 may be configured to determine and/or adapt one or more AAC parameters, for example, a prediction filter setting, a path transfer function setting, an AAC adaptive parameter setting, and/or an acoustic pattern extractor setting, for example, based on the passenger tracking information.

In one example, AAC controller 102 may be configured to set and/or dynamically adapt, e.g., in real time, one or more AAC parameters, for example, a prediction filter setting, a path transfer function setting, an AAC adaptive parameter setting, and/or an acoustic pattern extractor setting, for example, based on changes in the position of the head and/or the ear of a passenger in the sound control zone 110, e.g., in real time.

In one example, AAC controller 102 may be configured to set and/or dynamically adapt, e.g., in real time, a path transfer function setting of a path transfer between acoustic transducer 108 and one or more residual-noise sensing locations 107, for example, based on changes in the position of the head and/or the ear of a passenger in the sound control zone 110, e.g., in real time.

In some demonstrative aspects, the AAC information 129 may include seat position information corresponding to a positioning of one or more seats in the vehicle. For example, AAC information 129 may include seat position information corresponding to a positioning of a driver seat and/or a positioning of one or more passenger seats in the vehicle.

In one example, AAC controller 102 may be configured to set and/or dynamically adapt, e.g., in real time, one or more AAC parameters, for example, a prediction filter setting, a path transfer function setting, an AAC adaptive parameter setting, and/or an acoustic pattern extractor setting, for example, based on the seat position information.

In one example, AAC controller 102 may be configured to set and/or dynamically adapt, e.g., in real time, a path transfer function setting of a path transfer between acoustic transducer 108 and one or more residual-noise sensing locations 107, for example, based on changes in the seat position of the driver and/or the passenger, e.g., in real time.

In some demonstrative aspects, the AAC information 129 may include passenger information corresponding to one or more passengers in the vehicle. For example, AAC information 129 may include passenger information to indicate a count, a position, a location, a size, and/or measurements of one or more passengers in the vehicle.

In one example, AAC controller 102 may be configured to set and/or dynamically adapt, e.g., in real time, one or more AAC parameters, for example, a prediction filter setting, a path transfer function setting, an AAC adaptive parameter setting, and/or an acoustic pattern extractor setting, for example, based on the passenger information.

In one example, AAC controller 102 may be configured to set and/or dynamically adapt, e.g., in real time, a path transfer function setting of a path transfer between acoustic transducer 108 and one or more residual-noise sensing locations 107, a path transfer function setting of a path transfer between acoustic transducer 108 and one or more noise sensing locations 105, an acoustic pattern extractor setting, and/or a prediction filter setting, for example, based on the count, position, location, size, and/or measurements of one or more passengers in the vehicle, e.g., in real time.

In some demonstrative aspects, the AAC information 129 may include climate information corresponding to a climate inside the vehicle.

In one example, AAC controller 102 may be configured to set and/or dynamically adapt, e.g., in real time, one or more AAC parameters, for example, a prediction filter setting, a path transfer function setting, an AAC adaptive parameter setting, and/or an acoustic pattern extractor setting, for example, based on changes in the climate inside the vehicle, e.g., in real time.

In one example, AAC controller 102 may be configured to set and/or dynamically adapt, e.g., in real time, a path transfer function setting of a path transfer between acoustic transducer 108 and one or more residual-noise sensing locations 107, a path transfer function setting of a path transfer between acoustic transducer 108 and one or more noise sensing locations 105, an acoustic pattern extractor setting, and/or a prediction filter setting, for example, based on changes in the climate in the vehicle, e.g., in real time. For example, AAC controller 102 may be configured to set and/or dynamically adapt, e.g., in real time, a path transfer function setting of a path transfer between acoustic transducer 108 and one or more residual-noise sensing locations 107, a path transfer function setting of a path transfer between acoustic transducer 108 and one or more noise sensing locations 105, an acoustic pattern extractor setting, and/or a prediction filter setting, for example, based on a detected change, indicated by AAC information 129, in a temperature and/or a humidity level in the vehicle.

In some demonstrative aspects, AAC information 129 may include vehicular system information corresponding to a noise generating vehicular system of the vehicle, and AAC controller 102 may be configured to determine the sound control pattern for sound control signal 109, for example, based on the vehicular system information, e.g., as described below.

In some demonstrative aspects, AAC controller 102 may be configured to determine the sound control pattern for sound control signal 109, for example, based on the vehicular system information such that the sound control pattern is to control, reshape, reduce or eliminate noise from noise generating vehicular system in the sound control zone 110, e.g., as described below.

In some demonstrative aspects, the noise generating vehicular system may include, for example, an engine of the vehicle, tires of the vehicle, a braking system of the vehicle, a steering system of the vehicle, an air conditioning system of the vehicle, and/or any other system of the vehicle.

In some demonstrative aspects, AAC information 129 may include vehicular system setting information representing a setting of a vehicular system of the vehicle, e.g., as described below.

In some demonstrative aspects, AAC controller 102 may be configured to determine the sound control pattern for sound control signal 109, for example, based on the vehicular system setting information, e.g., as described below.

In some demonstrative aspects, AAC controller 102 may be configured to determine a first sound control pattern for sound control signal 109, for example, based on AAC information 129 including first vehicular system setting information representing a first setting of the vehicular system, e.g., as described below.

In some demonstrative aspects, AAC controller 102 may be configured to determine a second sound control pattern, different from the first sound control pattern, for sound control signal 109, for example, based on AAC information 129 including second vehicular system setting information representing a second setting of the vehicular system different from the first setting of the vehicular system, e.g., as described below.

In some demonstrative aspects, AAC controller 102 may be configured to dynamically update the sound control pattern for sound control signal 109, for example, based on a change in the vehicular system setting information representing a change in the setting of the vehicular system, e.g., as described below.

In some demonstrative aspects, AAC information 129 may include mode of operation information representing a mode of operation of a vehicular system of the vehicle, e.g., as described below.

In some demonstrative aspects, AAC controller 102 may be configured to determine the sound control pattern for sound control signal 109, for example, based on the mode of operation information, e.g., as described below.

In some demonstrative aspects, AAC controller 102 may be configured to determine a first sound control pattern for sound control signal 109, for example, based on AAC information 129 including first mode of operation information representing a first mode of operation of the vehicular system, e.g., as described below.

In some demonstrative aspects, AAC controller 102 may be configured to determine a second sound control pattern, different from the first sound control pattern, for sound control signal 109, for example, based on the AAC information 129 including second mode of operation information representing a second mode of operation of the vehicular system different from the first mode of operation of the vehicular system, e.g., as described below.

In some demonstrative aspects, AAC controller 102 may be configured to dynamically update the sound control pattern for sound control signal 109, for example, based on a change in the mode of operation information representing a change in the mode of operation of the vehicular system, e.g., as described below.

In some demonstrative aspects, AAC controller 102 may be configured to determine a sound control profile based on the AAC information 129, and to determine the sound control pattern for sound control signal 109, for example, based on the sound control profile, e.g., as described below.

In some demonstrative aspects, the sound control profile may include a setting of one or more sound control parameters, and AAC controller 102 may be configured to determine the sound control pattern for sound control signal 109, for example, based on the setting of the one or more sound control parameters, e.g., as described below.

In some demonstrative aspects, memory 198 may be configured to store a plurality of sound control profiles (AAC profiles) 199 corresponding to a plurality of sound control configurations, respectively, e.g., as described below.

In some demonstrative aspects, an AAC profile 199 corresponding to a particular sound control configuration may include, for example, a setting of one or more AAC parameters, for example, a prediction filter setting, a path transfer function setting, an AAC adaptive parameter setting, and/or an acoustic pattern extractor setting, corresponding to the particular sound control configuration, e.g., as described below.

In some demonstrative aspects, AAC controller 102 may be configured to select from the plurality of sound control profiles 198 a selected sound control profile based on the AAC information 129, and to determine the sound control pattern based on the selected sound control profile, e.g., as described below.

In some demonstrative aspects, controller 193 may be configured to determine the sound control pattern for sound control signal 109 based on the AAC information 129, for example, such that the sound control pattern is to control, reshape, reduce or eliminate in the at least one sound control zone 110 noise from one or more noise sources, e.g., as described below.

In one example, the AAC information 129 may include RPM information of the engine of the vehicle.

In one example, controller 193 may be configured to determine the sound control pattern for sound control signal 109, for example, based on the RPM information, for example, such that the sound control pattern is to control, reshape, reduce or eliminate noise from the engine and/or modify sound control pattern to improve the reduction of other noise sources in the at least one sound control zone 110.

In another example, controller 193 may be configured to determine and/or modify the sound control pattern for sound control signal 109, for example, based on the RPM information based on any other additional or alternative criteria, for example, to support control and/or reduction of one or more other sound patterns, e.g., to support reduction and/or elimination of noise from one or more other noise sources.

In another example, controller 193 may be configured to selectively and/or dynamically turn on/off, mute, and/or slow-down and/or halt (freeze) adaptation of, one or more AAC functionalities, for example, based on the RPM information and/or any other type of information in AAC information 129, e.g., as described below.

In another example, the AAC information 129 may include window/roof information to indicate an open/close state of the windows and/or roof of the vehicle, and/or a roof type of the roof, e.g., metal roof or panoramic roof. For example, controller 193 may be configured to determine the sound control pattern for sound control signal 109, for example, based on the window/roof information, for example, such that the sound control pattern is to control, reshape, reduce or eliminate in the at least one sound control zone 110 external noise from an environment of the vehicle, e.g., wind noise, road noise and the like.

In another example, the AAC information 129 may include road detection information corresponding to a road detection system of the vehicle. For example, controller 193 may be configured to determine the sound control pattern for sound control signal 109, for example, based on the road detection information, for example, such that the sound control pattern is to control, reshape, reduce or eliminate in the at least one sound control zone 110 external noise from an environment of the vehicle, e.g., based on a road type indicated by the road detection information.

In another example, the AAC information 129 may include tire information corresponding to a tire system of the vehicle. For example, controller 193 may be configured to determine the sound control pattern for sound control signal 109, for example, based on the RPM information, for example, such that the sound control pattern is to control, reshape, reduce or eliminate noise from the tires in the at least one sound control zone 110, for example, based on pressure of one or more tires of the vehicle, and/or a type and/or size of one or more tires of the vehicle.

In another example, the AAC information 129 may include climate information corresponding to a climate outside the vehicle. For example, controller 193 may be configured to determine the sound control pattern for sound control signal 109, for example, based on the climate information, for example, such that the sound control pattern is to control, reshape, reduce or eliminate in the at least one sound control zone 110 external noise from an environment of the vehicle, e.g., rain noise, wind noise, road noise, and/or any other noise.

In another example, the AAC information 129 may include steering information corresponding to a steering system of the vehicle. For example, controller 193 may be configured to determine the sound control pattern for sound control signal 109, for example, based on the steering information, for example, such that the sound control pattern is to control, reshape, reduce or eliminate in the at least one sound control zone 110 external noise from an environment of the vehicle, for example, based on an angle of a steering wheel of the vehicle, e.g., a left/right steering angle.

In another example, the AAC information 129 may include braking system information to indicate an operational state of a main braking system, an emergency braking system, an Anti-lock braking system (ABS), and/or any other breaking system of the vehicle. For example, controller 193 may be configured to determine the sound control pattern for sound control signal 109, for example, based on the braking system information, for example, such that the sound control pattern is to control, reshape, reduce or eliminate in the at least one sound control zone 110 external noise from an environment of the vehicle, for example, based on the operational state of the breaking system.

In some demonstrative aspects, AAC controller 193 may be configured to dynamically generate, control, modify, update, and/or adjust, e.g., in real time, the sound control pattern to be provided to acoustic transducer 108, e.g., via sound control signal 109, for example, based on the AAC information 129, e.g., as described below.

In some demonstrative aspects, AAC controller 193 may be configured to dynamically generate, control, modify, update, and/or adjust, e.g., in real time, the sound control pattern to be provided to acoustic transducer 108, e.g., via sound control signal 109, for example, by selectively generating the sound control signal 109 and/or selectively providing the sound control signal 109 to acoustic transducer 108, e.g., as described below.

In some demonstrative aspects, AAC controller 193 may be configured to dynamically generate, control, modify, update, and/or adjust, e.g., in real time, the sound control pattern to be provided to acoustic transducer 108, e.g., via sound control signal 109, for example, by selecting whether or not to provide the sound control signal 109 to acoustic transducer 108, e.g., as described below.

In some demonstrative aspects, AAC controller 193 may be configured to dynamically generate, control, modify, update, and/or adjust, e.g., in real time, the sound control pattern to be provided to acoustic transducer 108, e.g., via sound control signal 109, for example, by selecting whether or not to adapt one or more AAC parameters for generating the sound control signal 109, e.g., as described below.

In some demonstrative aspects, AAC controller 193 may be configured to dynamically mute, e.g., in real time, the sound control pattern to be provided to acoustic transducer 108, e.g., via sound control signal 109, and/or to dynamically reduce, e.g., in real time, the level of the sound control pattern to be provided to acoustic transducer 108, e.g., via sound control signal 109, for example, based on the AAC information 129, e.g., as described below.

In some demonstrative aspects, AAC controller 193 may be configured to dynamically identify based on AAC information 129, e.g., in real time, one or more predefined situations ("mute situations") in which the sound control pattern to be provided to acoustic transducer 108, e.g., via sound control signal 109, is to be muted or to be set to a reduced level, e.g., as described below.

In some demonstrative aspects, AAC controller 193 may be configured to mute or reduce a level of the sound control pattern to be provided to acoustic transducer 108, e.g., via sound control signal 109, for example, based on identification of a predefined mute situation, e.g., as described below.

In some demonstrative aspects, AAC controller 193 may be configured to mute the sound control pattern to be provided to acoustic transducer 108, e.g., via sound control signal 109, for example, by setting a Prediction Filter (PF) to zero, e.g., as described below.

In some demonstrative aspects, AAC controller 193 may be configured to mute the sound control pattern to be provided to acoustic transducer 108, e.g., via sound control signal 109, for example, by setting the input from the reference sensors 104 to zero, e.g., as described below.

In some demonstrative aspects, AAC controller 193 may be configured to mute the sound control pattern to be provided to acoustic transducer 108, e.g., via sound control signal 109, for example, by setting the sound control signal 109 to zero, e.g., as described below.

In some demonstrative aspects, AAC controller 193 may be configured to mute the sound control pattern to be provided to acoustic transducer 108, e.g., via sound control signal 109, for example, by selecting not to call an AAC function for generating the sound control pattern, e.g., as described below.

In some demonstrative aspects, AAC controller 193 may be configured to mute the sound control pattern to be provided to acoustic transducer 108, e.g., via sound control signal 109, for example, by selectively zeroing some or all of the inputs/outputs of the acoustic pattern extractor, e.g., as described below.

In some demonstrative aspects, AAC controller 193 may be configured to mute the sound control pattern to be provided to acoustic transducer 108, e.g., via sound control signal 109, for example, based on any other additional or alternative setting and/or mechanism.

In some demonstrative aspects, AAC controller 193 may be configured to dynamically slow-down and/or halt ("freeze"), e.g., in real time, for example, based on the AAC information 129, an adaptation of one or more AAC parameters for generating the sound control signal 109, e.g., as described below.

In some demonstrative aspects, AAC controller 193 may be configured to dynamically identify based on AAC information 129, e.g., in real time, one or more predefined situations ("adaptation slow/freeze situations") in which the adaptation of one or more AAC parameters for generating the sound control signal 109 is to be slowed down or halted, e.g., as described below.

In some demonstrative aspects, AAC controller 193 may be configured to slow-down and/or halt the adaptation of one or more AAC parameters for generating the sound control signal 109, for example, based on identification of a predefined adaptation freeze situation, e.g., as described below.

In some demonstrative aspects, AAC controller 193 may be configured to halt the adaptation of one or more AAC parameters for generating the sound control signal 109, for example, by setting the input from the residual-noise sensors 106 to zero, e.g., as described below.

In some demonstrative aspects, AAC controller 193 may be configured to halt the adaptation of one or more AAC parameters for generating the sound control signal 109, for example, by setting one or more Speaker Transfer Functions (STF) to zero, e.g., as described below.

In some demonstrative aspects, AAC controller 193 may be configured to halt the adaptation of one or more AAC parameters for generating the sound control signal 109, for example, by setting a PF step size to zero, e.g., as described below.

In some demonstrative aspects, AAC controller 193 may be configured to slow down the adaptation of one or more AAC parameters for generating the sound control signal 109, for example, by increasing a PF step size, for example, by increasing one or more update rate parameters $\mu_{km}$, e.g., as described below.

In some demonstrative aspects, AAC controller 193 may be configured to halt the adaptation of one or more AAC parameters for generating the sound control signal 109, for example, by selecting not to call an adaptive AAC function, which may be used for adapting one or more parameters for generating the sound control pattern, e.g., as described below.

In some demonstrative aspects, AAC controller 193 may be configured to slow-down and/or halt the adaptation of one or more AAC parameters for generating the sound control signal 109, for example, based on any other additional or alternative setting and/or mechanism.

In some demonstrative aspects, AAC information 192 may include speech detection information to indicate detected speech of one or more passengers in the vehicle.

In some demonstrative aspects, information sources 120 may include a speech detector to generate the speech detection information.

In one example, the speech detector may be configured to generate the speech detection information, for example, based on acoustic information from the reference acoustic sensors 104.

In another example, the speech detector may be configured to generate the speech detection information, for example, based on acoustic information from one or more other acoustic sensors, e.g., dedicated speech detection sensors and/or any other dedicated or non-dedicated sensors.

In some demonstrative aspects, AAC controller 193 may be configured to slow-down and/or halt the adaptation of one or more AAC parameters for generating the sound control signal 109, for example, based on identifying that AAC information 192 indicates the detection of speech.

In some demonstrative aspects, AAC controller 193 may be configured to mute the sound control pattern to be provided to acoustic transducer 108, e.g., via sound control signal 109, for example, based on identifying that AAC information 192 indicates the detection of speech.

In some demonstrative aspects, AAC information 192 may include audio information corresponding to audio to be heard in the vehicle.

In some demonstrative aspects, information sources 120 may include an audio source or audio controller to provide and/or control the audio to be heard in the vehicle.

In some demonstrative aspects, AAC controller 193 may be configured to selectively slow-down and/or halt the adaptation of one or more AAC parameters for generating the sound control signal 109, for example, based on the audio information.

In some demonstrative aspects, AAC controller 193 may be configured to selectively slow-down and/or halt the adaptation of one or more AAC parameters for generating the sound control signal 109, for example, based on an audio level and/or equalization level of the audio to be heard in the vehicle.

In some demonstrative aspects, AAC controller 193 may be configured to mute the sound control pattern to be provided to acoustic transducer 108, e.g., via sound control signal 109, for example, based on a level of an output of the acoustic transducer 108. For example, AAC controller 193 may be configured to mute the sound control pattern to be provided to acoustic transducer 108, e.g., via sound control signal 109, for example, based on a detection that the output level of the acoustic transducer 108 is greater than a predefined threshold ("max speaker threshold"), and/or based on a detection that the output level of the acoustic transducer 108 is less than a predefined threshold ("min speaker threshold").

In some demonstrative aspects, AAC controller 193 may be configured to slow-down and/or halt the adaptation of one or more AAC parameters for generating the sound control signal 109, for example, based on the output level of the acoustic transducer 108. For example, AAC controller 193 may be configured to slow-down and/or halt the adaptation of one or more AAC parameters for generating the sound control signal 109, for example, based on a detection that the output level of the acoustic transducer 108 is greater than the max speaker threshold, and/or based on a detection that the output level of the acoustic transducer 108 is less than the min speaker threshold.

In some demonstrative aspects, AAC controller 193 may be configured to mute the sound control pattern to be provided to acoustic transducer 108, e.g., via sound control signal 109, for example, based on a level of a noise input 104. For example, AAC controller 193 may be configured to mute the sound control pattern to be provided to acoustic transducer 108, e.g., via sound control signal 109, for example, based on a detection that the level of the noise input 104 is greater than a predefined threshold ("max ref. threshold"), and/or based on a detection that the level of the noise input 104 is less than a predefined threshold ("min ref. threshold").

In some demonstrative aspects, AAC controller 193 may be configured to slow-down and/or halt the adaptation of one or more AAC parameters for generating the sound control signal 109, for example, based on the level of the noise input 104. For example, AAC controller 193 may be configured to slow-down and/or halt the adaptation of one or more AAC parameters for generating the sound control signal 109, for example, based on a detection that the level of the noise input 104 is greater than the max ref. threshold, and/or based on a detection that the level of the noise input 104 is less than the min ref. threshold.

In some demonstrative aspects, AAC controller 193 may be configured to mute the sound control pattern to be provided to acoustic transducer 108, e.g., via sound control signal 109, for example, based on a level of a residual-noise input 106. For example, AAC controller 193 may be configured to mute the sound control pattern to be provided to acoustic transducer 108, e.g., via sound control signal 109, for example, based on a detection that the level of the residual-noise input 106 is greater than a predefined threshold ("max residual threshold"), and/or based on a detection that the level of the residual-noise input 106 is less than a predefined threshold ("min residual threshold").

In some demonstrative aspects, AAC controller 193 may be configured to slow-down and/or halt the adaptation of one or more AAC parameters for generating the sound control signal 109, for example, based on the residual-noise input 106. For example, AAC controller 193 may be configured to slow-down and/or halt the adaptation of one or more AAC parameters for generating the sound control signal 109, for example, based on a detection that the residual-noise input 106 is greater than the max residual threshold, and/or based on a detection that the residual-noise input 106 is less than the min residual threshold.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a determination that one or more acoustic sensors are faulty and/or malfunctioning.

In some demonstrative aspects, AAC controller 193 may be configured to detect that one or more acoustic sensors are faulty and/or malfunctioning, for example, based on AAC information 129.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a determination that one or more reference acoustic sensors 119 are faulty and/or malfunctioning.

In some demonstrative aspects, AAC controller 193 may be configured to detect the one or more reference acoustic sensors 119, which are faulty and/or malfunctioning, for example, based on the noise inputs 104 and/or based on any other information in AAC information 129.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a determination that one or more residual-noise acoustic sensors 121 are faulty and/or malfunctioning.

In some demonstrative aspects, AAC controller 193 may be configured to detect the one or more residual-noise acoustic sensors 121, which are faulty and/or malfunctioning, for example, based on the residual noise inputs 106 and/or based on any other information in AAC information 129.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on the speed information corresponding to the speed of the vehicle.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the speed information indicates that the speed of the vehicle is above a predefined vehicle speed threshold and/or out of a predefined vehicle speed range.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on the opening state information corresponding to the one or more openings of the vehicle.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the opening state information indicates that a door of the vehicle is open, a window is open, e.g., more than a predefined opening percentage, that the trunk of the vehicle is open, and/or that the roof of the vehicle is open, e.g., more than a predefined opening percentage.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on the tire information corresponding to the tire system of the vehicle.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the tire information indicates that a tire pressure of one or more tires is not in a predefined range of tire pressures.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on climate information corresponding to the climate in the vehicle.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the climate information indicates that the temperature in the vehicle is not in a predefined range of temperatures, and/or that a humidity level in the vehicle is not in a predefined range of humidity levels.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on climate information corresponding to the climate outside the vehicle.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the climate information indicates that the temperature outside the vehicle is not in a predefined range of temperatures, and/or that a humidity level outside the vehicle is not in a predefined range of humidity levels.

In some demonstrative aspects, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on the vehicular system information corresponding to the vehicular systems of the vehicle.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the vehicular system information indicates that an operation condition of a vehicular system is not in a predefined range of operation conditions.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the vehicular system information indicates that the engine RPM is not in a predefined range of RPMs.

In one example, AAC controller 193 may be configured to mute the sound control pattern to be provided to acoustic transducer 108, e.g., via sound control signal 109, and/or to slow-down and/or halt the adaptation of one or more AAC parameters for generating the sound control signal 109, based on a detection that the vehicular system information indicates that an operational condition of an air conditioning system of the vehicle is not in a predefined operational condition range and/or a blower speed of the air conditioning system of the vehicle is not in a predefined blower operational range.

In some demonstrative aspects, controller 193 may be configured to dynamically update the sound control pattern for sound control signal 109, for example, based on a detected change in the AAC information 129 representing a change in the acoustic configuration of the operation of the AAC system, e.g., as described below.

For example, controller 193 may be configured to dynamically monitor the AAC input 129 to detect, e.g., in real time, changes in the AAC information 129.

For example, controller 193 may be configured to dynamically update the sound control pattern for sound control signal 109, e.g., in real time, for example, based on the detected changes in the AAC information 129.

In some demonstrative aspects, controller 193 may be configured to determine a setting of one or more sound control parameters based on the AAC information 129, and to determine the sound control pattern based on the setting of the one or more sound control parameters, e.g., as described below.

In other aspects, controller 193 may be configured to determine the setting of the one or more sound control parameters based on any other additional or alternative criterion relating to AAC information 129.

In some demonstrative aspects, controller 193 may be configured to determine an AAC profile based on the AAC information 129, e.g., as described below.

In some demonstrative aspects, controller 193 may be configured to determine the sound control pattern for sound control signal 109 based on the AAC profile, e.g., as described below.

In some demonstrative aspects, the AAC profile may include a setting of one or more sound control parameters, which may be utilized in determining the sound control pattern for sound control signal 109, e.g., as described below.

In some demonstrative aspects, controller 193 may be configured to determine the sound control pattern for sound control signal 109, for example, based on the setting of the one or more sound control parameters, e.g., as described below.

In some demonstrative aspects, memory 198 may be configured to store a plurality of AAC profiles 199, e.g., as described below.

In some demonstrative aspects, an AAC profile 199 may include a setting of one or more sound control parameters corresponding to an AAC operational configuration of AAC system 100, e.g., as described below.

In one example, a first AAC profile 199 may correspond to a first AAC operation configuration of AAC system 100. According to this example, a first AAC profile 199 corresponding to the first AAC operation configuration of AAC system 100 may include, for example, a first setting of one or more sound control parameters. For example, the first setting of the one or more sound control parameters may be configured for sound control to be applied, e.g., when AAC system 100 is operated at a first operational condition.

In another example, a second AAC profile 199 may correspond to a second AAC operation configuration of AAC system 100. According to this example, a second AAC profile 199 corresponding to the second AAC operation configuration of AAC system 100 may include, for example, a second setting of one or more sound control parameters, e.g., different from the first setting. For example, the second setting of the one or more sound control parameters may be configured for sound control to be applied, e.g., when AAC system 100 is operated at a second operational condition, e.g., different from the first operational condition.

In some demonstrative aspects, controller 193 may be configured to select from the plurality of AAC profiles 199 a selected AAC profile, for example, based on the AAC information 129, and to determine the sound control pattern for the sound control signal 109, for example, based on the selected AAC profile, e.g., as described below.

In some demonstrative aspects, an AAC profile 199 may include a user-based profiles corresponding to one or more users, e.g., as described below.

In some demonstrative aspects, a user-based profile corresponding to a user may include, for example, a setting of one or more sound control parameters based on a preference of the user, e.g., as described below.

In some demonstrative aspects, the user-based profile may correspond to a user, which may be allowed to control a user preference with respect to the sound control zone 110, e.g., as described above.

In one example, a user-based profile may correspond to a user of the sound control zone 110. For example, a user-based profile of a driver of a vehicle may include, for example, a setting of one or more sound control parameters based on a preference of the driver with respect to the sound control zone 110 implemented with respect to a driver seat of the vehicle.

In another example, a user-based profile may correspond to a first user to control a user preference with respect to the sound control zone 110, which may be used by a second user. For example, the user-based profile of the driver of the vehicle may include, for example, a setting of one or more sound control parameters based on a preference of the driver with respect to the sound control zone 110 implemented with respect to one or more passenger seats of the vehicle.

In some demonstrative aspects, the AAC information 129 may include user identity information corresponding to an identity of a user, and controller 193 may select from the plurality of AAC profiles 199 a selected user-based profile based on the user identity information.

In one example, AAC profiles 199 may include a user-based profile corresponding to a driver of a vehicle. For example, the controller 193 may be configured to identify the identity information corresponding to the driver of the vehicle, for example, based on AAC information 129, e.g., received from a system of the vehicle. For example, controller 193 may select from the plurality of AAC profiles 199 a selected user-based profile corresponding to the driver, for example, based on the user identity information corresponding to the driver.

For example, user-based profile corresponding to the driver may include information to define a setting of one or more sound control parameters for sound control zone 110 based on a preference of the driver.

In one example, the user-based profile corresponding to the driver may include information to define a setting of one or more sound control parameters for a driver sound control zone 110 corresponding to a seat of the driver. In another example, the user-based profile corresponding to the driver may include information to define a setting of one or more sound control parameters for a passenger sound control zone 110 corresponding to a seat of a passenger in the vehicle.

In some demonstrative aspects, controller 193 may be configured to determine the sound control pattern for the sound control signal 109 corresponding to the sound control zone 110, for example, based on setting of one or more sound control parameters for the sound control zone 110, e.g., according to the user-based profile corresponding to the driver.

In some demonstrative aspects, the setting of the one or more sound control parameters may include a prediction filter (PF) setting for determining the sound control pattern based on the plurality of noise inputs 104 and the plurality of residual-noise inputs 106, e.g., as described below.

In some demonstrative aspects, the setting of the one or more sound control parameters may include a prediction filter weight vector to be applied for determining the sound control pattern based on the plurality of noise inputs 104 and the plurality of residual-noise inputs 106, e.g., as described below.

In some demonstrative aspects, the setting of the one or more sound control parameters may include an update rate parameter for updating the prediction filter weight vector, e.g., as described below.

In some demonstrative aspects, the setting of the one or more sound control parameters may include one or more path transfer functions, e.g., including one or more Speaker Transfer Functions (STFs), to be applied for determining the sound control pattern based on the plurality of noise inputs 104 and the plurality of residual-noise inputs 106, e.g., as described below.

In some demonstrative aspects, the setting of the one or more sound control parameters may include a setting of a level of noise cancellation, noise control, and/or sound insulation to be applied in the sound control zone 110.

In one example, an AAC profile 199 corresponding to a sound control zone 110, e.g., a driver sound control zone, may define a level of sound insulation between the driver sound control zone and one of more other sound control zones, e.g., a passenger sound control zone. For example, the level of sound insulation between the driver sound control zone and the other sound control zone may represent a level at which sound from the driver sound control zone may be heard at the other sound control zone, and/or a level at which sound may from the other sound control zone may be heard at the driver sound control zone.

In another example, an AAC profile 199 corresponding to a sound control zone 110, e.g., a driver sound control zone, may define a level of sound insulation between the driver sound control zone and an environment, e.g., an environment outside the vehicle. For example, the level of sound insulation between the driver sound control zone and the environment, may represent a level at which sound from the environment may be heard at the driver sound control zone.

In some demonstrative aspects, the setting of the one or more sound control parameters may include a setting of a level of audio to be heard in the sound control zone 110.

In other aspects, the setting of the one or more sound control parameters may include a setting of one or more additional or alternative parameters, weights, coefficients, and/or functions to be applied for determining the sound control pattern based on the plurality of noise inputs 104 and the plurality of residual-noise inputs 106.

In some demonstrative aspects, controller 193 may determine sound control signal 109, for example, by applying an estimation function or a prediction function on noise inputs 104 and/or residual-noise inputs 106, e.g., as described below.

In some demonstrative aspects, controller 193 may include an estimator (also referred to as a "prediction unit") configured to apply the estimation or prediction function to noise inputs 104 and/or residual-noise inputs 106, e.g., as described below.

In some demonstrative aspects, controller 193 may be configured to cause the estimator or prediction unit to utilize one or more prediction parameters, e.g., for the estimation function, for example, based on the AAC information 129, e.g., as described below.

In one example, controller 193 may be configured to determine a first set of prediction parameters for a first AAC configuration of AAC system 100, e.g., based on first AAC information 129.

In another example, controller 193 may be configured to determine a second set of prediction parameters for a second AAC configuration of AAC system 100, e.g., based on second AAC information 129

In some demonstrative aspects, controller 193 may determine one or more prediction parameters for an AAC configuration, for example, based on a Look Up Table (LUT), e.g., as described below.

In some demonstrative aspects LUT may be configured to map a plurality of AAC configurations and a plurality of settings for the prediction parameters, In one example, the LUT may be configured to match between first prediction parameters and first AAC configuration, and/or the LUT may match between second prediction parameters, e.g., different from the first prediction parameters, and a second AAC configuration, e.g., different from the first HVAACAC configuration.

In some demonstrative aspects, controller 193 may determine the one or more prediction parameters for the AAC configuration, for example, based on any other additional or alternative algorithm, method, function, and/or procedure.

In some demonstrative aspects, the prediction parameters may include weights, coefficients, functions, and/or any other additional or alternative parameter to be utilized for determining the sound control pattern, e.g., as described below.

In some demonstrative aspects, the prediction parameters may include one or more path transfer function parameters of the estimation or prediction function, e.g., as described below. In one example, the prediction parameters may include one or more STFs to be applied by controller 193 for determining the sound control pattern. In one example, the STFs may include a representation of acoustic paths from one or more of the acoustic transducers 108 to one or more of the noise sensing locations 105.

In some demonstrative aspects, the prediction parameters may include one or more update rate parameters corresponding to an updating rate of the weighs of the estimation or prediction function, e.g., as described below.

In other aspects, the prediction parameters may include any other additional or alternative parameters.

In some demonstrative aspects, controller 193 may be configured to determine, set, adapt and/or update one or more of the STFs based on changes in the AAC configuration indicated by the AAC information 129, e.g., as described below.

In some demonstrative aspects, controller 193 may be configured to determine, set, adapt and/or update one or more of the prediction parameters based on changes in the AAC configuration indicated by the AAC information 129, e.g., as described below.

In some demonstrative aspects, AAC controller 193 may be configured according to a non-hybrid scheme, e.g., as described below.

In some demonstrative aspects, the non-hybrid scheme may include a noise prediction filter, which may be applied to a prediction filter input, which is based on a noise input 104, e.g., as described below.

Figure 3:
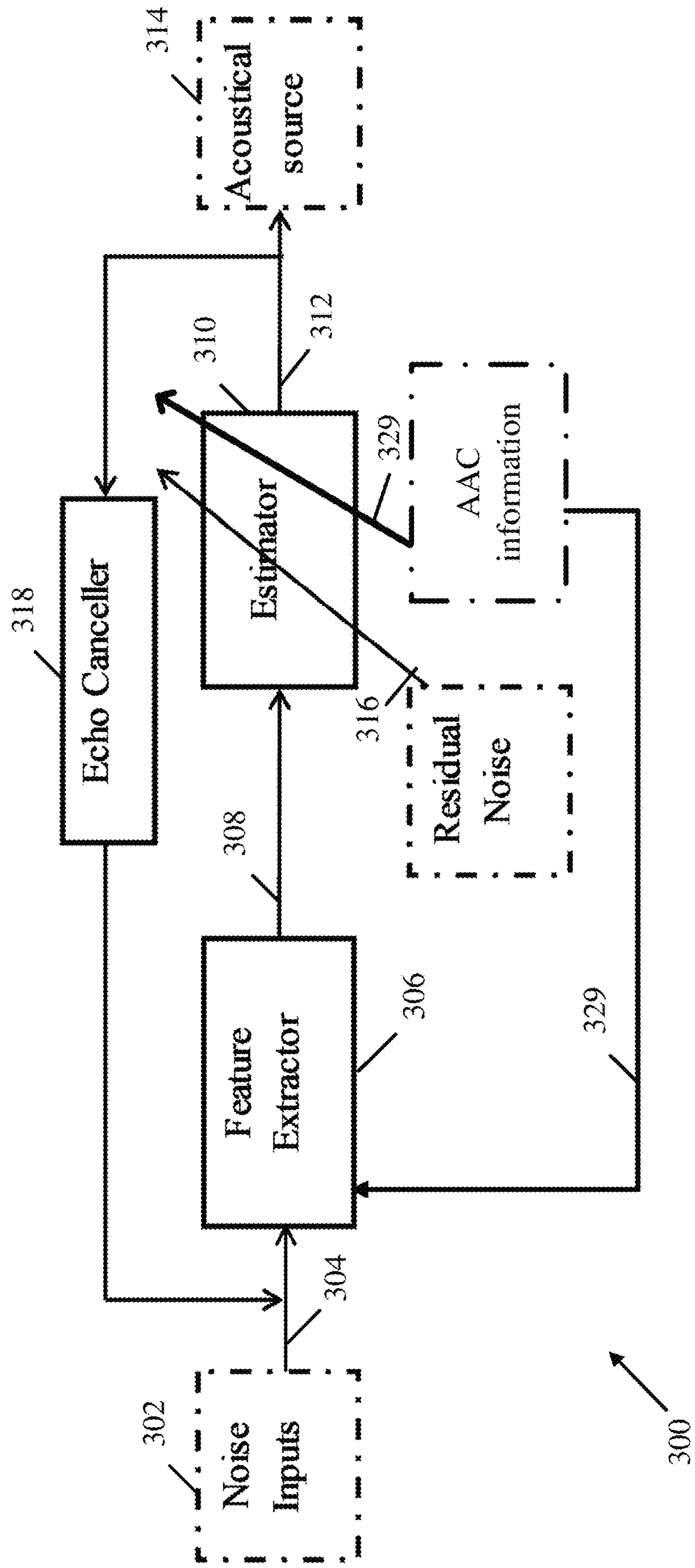
FIG. 3 is a schematic block diagram illustration of a controller, in accordance with some demonstrative aspects.

Reference is now made to FIG. 3, which schematically illustrates a controller 300, in accordance with some demonstrative aspects. In some aspects, AAC controller 102 (FIG. 1) and/or controller 193 (FIG. 1) may perform, for example, one or more functionalities and/or operations of controller 300.

In some demonstrative aspects, controller 300 may receive AAC information 329, e.g., including the AAC information 129 (FIG. 1).

In some demonstrative aspects, controller 300 may receive a plurality of inputs 304, e.g., including inputs 104 (FIG. 1), representing acoustic noise at a plurality of predefined noise sensing locations, e.g., locations 105 (FIG. 2).

Controller 300 may generate a sound control signal 312 to control at least one acoustic transducer 314, e.g., acoustic transducer 108 (FIG. 1).

In some demonstrative aspects, controller 300 may include an estimator ("prediction unit") 310 to estimate signal 312 by applying an estimation function to an input 308 corresponding to inputs 304. As shown in FIG. 3, controller 300 may also include an echo canceller 318.

In some demonstrative aspects, estimator 310 may estimate signal 312, for example, based on the AAC information 329, e.g., as described below.

In some demonstrative aspects, e.g., as shown in FIG. 3, controller 300 may include an extractor 306 to extract a plurality of disjoint reference acoustic patterns from inputs 304. According to these aspects, input 308 may include the plurality of disjoint reference acoustic patterns.

In some demonstrative aspects, controller 300 may generate signal 312 configured to control, reshape, reduce and/or eliminate the noise produced by one or more noise sources, e.g., as described above.

In some demonstrative aspects, controller 300 may generate sound control signal 312 configured to control, reshape, reduce and/or eliminate the noise energy and/or wave amplitude of one or more sound patterns within the sound control zone, while the noise energy and/or wave amplitude of one or more other sound patterns may not be affected within the sound control zone.

In some demonstrative aspects, sound control signal 312 may be configured to control, reshape, reduce and/or eliminate the noise produced by one or more vehicular systems, e.g., as described above.

In some demonstrative aspects, feature extractor 306 may be configured to determine, update, and/or adjust, e.g., in real-time, a setting of at least one acoustic pattern extractor parameter based on the AAC information 329, and to determine the plurality of disjoint reference acoustic patterns for input 308, for example, based on the acoustic pattern extractor parameter setting.

In other aspects, controller 300 may not include extractor 306. Accordingly, input 308 may include inputs 304 and/or any other input based on inputs 304.

In some demonstrative aspects, estimator 310 may apply any suitable linear and/or non-linear estimation function to input 308. In one example, the estimation function may include a non-linear estimation function, e.g., a radial basis function.

In some demonstrative aspects, estimator 310 may be able to adapt one or more parameters of the estimation function based on a plurality of residual-noise inputs 316 representing acoustic residual-noise at a plurality of predefined residual-noise sensing locations, which are located within the noise-control zone. For example, inputs 316 may include inputs 106 (FIG. 1) representing acoustic residual-noise at residual-noise sensing locations 107 (FIG. 2), which are located within noise-control zone 110 (FIG. 2).

In some demonstrative aspects, one or more of inputs 316 may include at least one virtual microphone input corresponding to a residual noise ("noise error") sensed by at least one virtual error sensor at least one particular residual-noise sensor location of locations 107 (FIG. 2). For example, controller 300 may evaluate the noise error at the particular residual-noise sensor location based on inputs 308 and the predicted noise signal 312, e.g., as described below.

In some demonstrative aspects, estimator 310 may be configured to determine an AAC parameter setting based on the AAC information 329, and to determine a sound control pattern for sound control signal 312, for example, by applying the AAC parameter setting to noise inputs 302 and/or residual-noise inputs 316.

In some demonstrative aspects, estimator 310 may be configured to adapt the AAC parameter setting, for example, based on a change in the AAC information 329.

In some demonstrative aspects, estimator 310 may be configured to determine a prediction filter setting of at least one prediction filter, for example, based on the AAC information 329, and to determine the sound control pattern for sound control signal 312, for example, based on the prediction filter setting.

In some demonstrative aspects, estimator 310 may be configured to determine a prediction filter setting including a prediction filter weight vector to be applied by the prediction filter for determining the sound control pattern based on noise inputs 302 and/or residual-noise inputs 316.

In some demonstrative aspects, estimator 310 may be configured to determine a prediction filter setting including an update rate parameter for updating the prediction filter weight vector.

In some demonstrative aspects, estimator 310 may be configured to determine a path transfer function setting of one or more path transfer functions, for example, based on the AAC information 329, and to apply the path transfer function setting for determining the sound control pattern for sound control signal 312, for example, based noise inputs 302 and/or residual-noise inputs 316.

In some demonstrative aspects, estimator 310 may include a multi-input-multi-output (MIMO) prediction unit configured, for example, to generate a plurality of sound control patterns corresponding to the n-th sample, e.g., including M control patterns, denoted $y_1(n) \ldots y_M(n)$, to drive a plurality of M respective acoustic transducers, e.g., based on the inputs 308.

Figure 4:
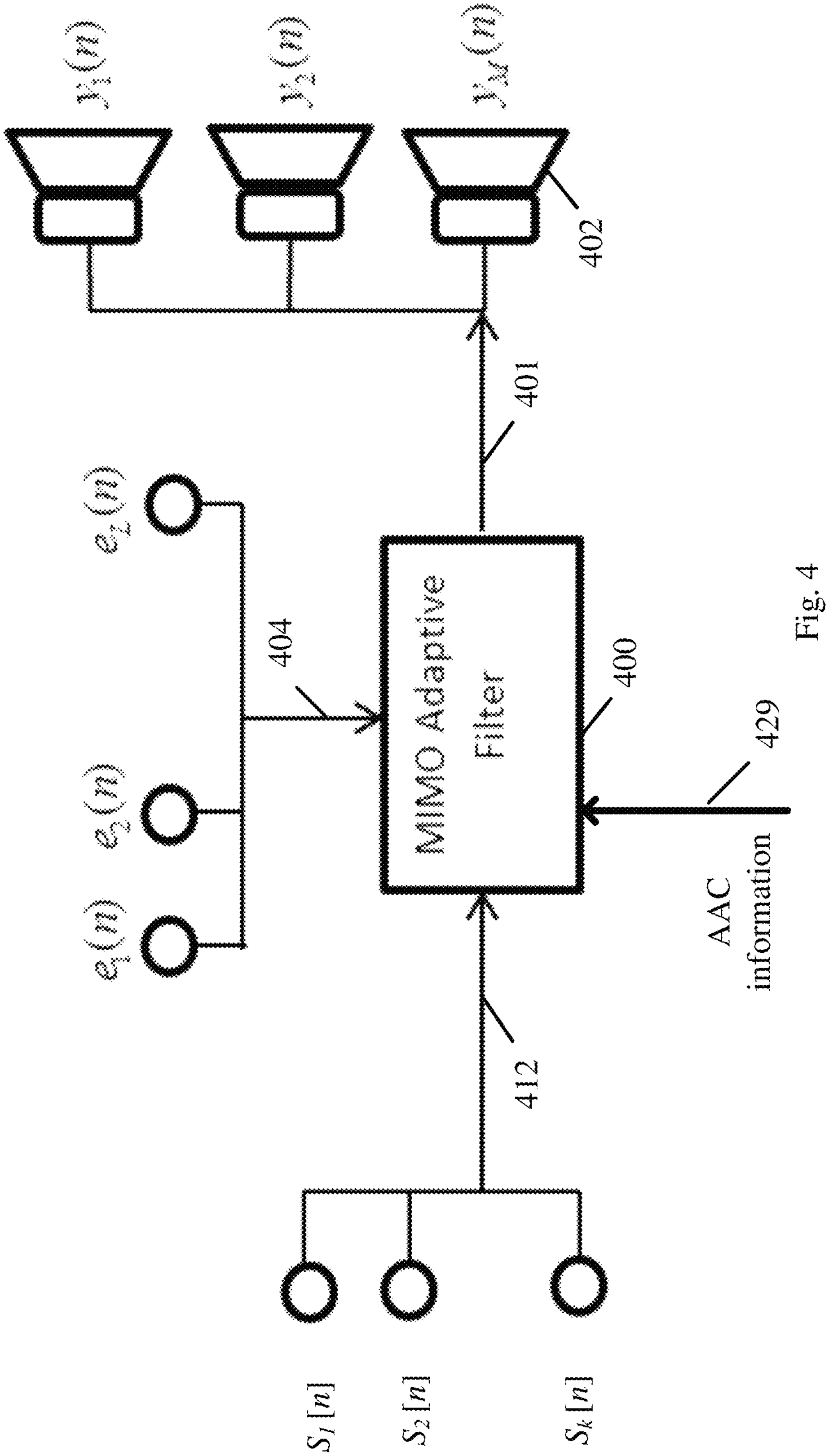
FIG. 4 is a schematic block diagram illustration of a Multiple-Input-Multiple-Output (MIMO) prediction unit, in accordance with some demonstrative aspects.

Reference is now made to FIG. 4, which schematically illustrates a MIMO prediction unit 400, in accordance with some demonstrative aspects. In some demonstrative aspects, estimator 310 (FIG. 3) may include MIMO prediction unit 400, and/or perform one or more functionalities of, and/or operations of, MIMO prediction unit 400.

As shown in FIG. 4, prediction unit 400 may be configured to receive AAC information 429, e.g., including the AAC configuration information 129 (FIG. 1).

As shown in FIG. 4, prediction unit 400 may be configured to receive an input 412 including the vector $\hat{S}[n]$, e.g., as output from extractor 306 (FIG. 3), and to drive a loudspeaker array 402 including M acoustic transducers, e.g., acoustic transducers 108 (FIG. 2).

For example, prediction unit 400 may generate a controller output 401 including the M sound control patterns $y_1(n) \ldots y_M(n)$, to drive a plurality of M respective acoustic transducers, e.g., acoustic transducers 108 (FIG. 2), for example, based on the inputs 412, a plurality of residual-noise inputs 404, e.g., including a plurality of residual-noise inputs 316 (FIG. 3), and/or the AAC information 429.

In some demonstrative aspects, prediction unit 400 may be configured to determine an AAC parameter setting based on the AAC information 429, and to determine controller output 401, for example, by applying the AAC parameter setting to noise inputs 412 and/or residual-noise inputs 404, e.g., as described below.

In some demonstrative aspects, prediction unit 400 may be configured to adapt the AAC parameter setting, for example, based on a change in the AAC information 429, e.g., as described below.

In some demonstrative aspects, prediction unit 400 may be configured to determine a prediction filter setting of at least one prediction filter, for example, based on the AAC information 449, and to determine the controller output 401, for example, based on the prediction filter setting, e.g., as described below.

In some demonstrative aspects, prediction unit 400 may be configured to determine a prediction filter setting including a prediction filter weight vector to be applied by the prediction filter for determining the sound control pattern based on noise inputs 412 and/or residual-noise inputs 404, e.g., as described below.

In some demonstrative aspects, prediction unit 400 may be configured to determine a prediction filter setting including an update rate parameter for updating the prediction filter weight vector, e.g., as described below.

In some demonstrative aspects, prediction unit 400 may be configured to determine a path transfer function setting of one or more path transfer functions, for example, based on the AAC information 429, and to apply the path transfer function setting for determining the controller output 401, for example, based noise inputs 412 and/or residual-noise inputs 404, e.g., as described below.

In some demonstrative aspects, interference (cross-talk) between two or more of the M acoustic transducers of array 402 may occur, for example, when two or more, e.g., all of, the M acoustic transducers generate the control noise pattern, e.g., simultaneously.

In some demonstrative aspects, prediction unit 400 may generate output 401 configured to control array 402 to generate a substantially optimal sound control pattern, e.g., while simultaneously optimizing the input signals to each speaker in array 402. For example, prediction unit 400 may control the multi-channel speakers of array 402, e.g., while cancelling the interface between the speakers.

In one example, prediction unit 400 may utilize a linear function with memory. For example, prediction unit 400 may determine a sound control pattern, denoted $y_m[n]$, corresponding to an m-th speaker of array 402 with respect to the n-th sample of the primary pattern, e.g., as follows:

$$y_m[n] = \sum_{k=1}^{K}\sum_{i=1}^{I-1} w_{km}[i]s_k[n-i] \tag{2}$$

wherein $s_k[n]$ denotes the k-th disjoint reference acoustic pattern, e.g., received from extractor 306 (FIG. 3), and $w_{km}[i]$ denotes a prediction filter coefficient configured to drive the m-th speaker based on the k-th disjoint reference acoustic pattern, e.g., as described below.

In another example, prediction unit 400 may implement any other suitable prediction algorithm, e.g., linear, or non-linear, having or not having memory, and the like, to determine the output 401.

In some demonstrative aspects, prediction unit 400 may optimize the prediction filter coefficients $w_{km}[i]$, for example, based on a plurality of residual-noise inputs 404, $e_1[n], e_2[n], \ldots, e_L[n]$ e.g., including a plurality of residual-noise inputs 316 (FIG. 3). For example, prediction unit 400 may optimize the prediction filter coefficients $w_{km}[i]$, for example, to achieve maximal destructive interference at the residual-error sensing locations 107 (FIG. 2). For example, locations 107 may include L locations, and inputs 404 may include L residual noise components, denoted $e_1[n], e_2[n], \ldots, e_L[n]$.

In some demonstrative aspects, prediction unit 400 may optimize one or more of, e.g., some or all of, the prediction filter coefficients $w_{km}[i]$ based, for example, on a minimum mean square error (MMSE) criterion, or any other suitable criteria. For example, a cost function, denoted J, for optimization of one or more, of, e.g., some or all of, the prediction filter coefficients $w_{km}[i]$ may be defined, for example, as a total energy of the residual noise components $e_1[n], e_2[n], \ldots, e_L[n]$ at locations 107 (FIG. 2), e.g., as follows:

$$J = E\left\{\sum_{l=1}^{L} e_l^2[n]\right\} \tag{3}$$

In some demonstrative aspects, a residual noise pattern, denoted $e_l[n]$, at an l-th location may be expressed, for example, as follows:

$$e_l[n] = d_l[n] - \sum_{m=1}^{M}\sum_{j=0}^{J-1} stf_{lm}[j]\cdot y_m[n-j] = d_l[n] - \sum_{m=1}^{M}\sum_{j=0}^{J-1} stf_{lmj}[j]\sum_{k=1}^{K}\sum_{i=1}^{I-1} w_{km}[i]s_k[n-i] \tag{4}$$

wherein $stf_{lm}[j]$ denotes a path transfer function having J coefficients from the m-th speaker of the array 402 at a l-th location; and $w_{km}[n]$ denotes an adaptive weight vector of the prediction filter with I coefficients representing the relationship between the k-th reference acoustic pattern $s_k[n]$ and the control signal of the m-th speaker.

In some demonstrative aspects, prediction unit 400 may optimize one or more elements of, e.g., some or all elements of, the adaptive weights vector $w_{km}[n]$, e.g., to reach an optimal point, e.g., a maximal noise reduction, e.g., based on the AAC information 429. For example, prediction unit 400 may implement a gradient based adaption method, when at each step the weight vector $w_{km}[n]$ is updated in a negative direction of a gradient of the cost function J, e.g., as follows:

$$w_{km}[n+1] = w_{km}[n] - \frac{\mu_{km}}{2}\cdot\nabla J_{km} \tag{5}$$

$$\nabla J_{km} = -2\sum_{l=1}^{L} e_l[n]\sum_{i=1}^{I-1} stf_{km}[n]x_k[n-i]$$

$$w_{km}[n+1] = w_{km}[n] + \mu_{km}\cdot\sum_{l=1}^{L} e_l[n]\sum_{i=1}^{I-1} stf_{km}[n]x_k[n-i]$$

Referring back to FIG. 1, in some demonstrative aspects, controller 193 may be configured to update one or more parameters of Equations 3, 4 and/or 5, for example, based on AAC information 129, e.g., as described below.

In other aspects, controller 193 (FIG. 1) may be configured to update one or more other additional or alternative parameters for prediction unit 400 (FIG. 4) and/or estimator 310 (FIG. 3).

In some demonstrative aspects, controller 193 may be configured to update the one or more parameters of Equations 3, 4 and/or 5, for example, based on AAC information 129, for example, to generate controller output 401 (FIG. 4), which may be configured based on AAC information 129.

In some demonstrative aspects, controller 193 may update one or more path transfer functions $stf_{lm}[j]$ in Equations 4 and/or 5, for example, based on AAC information 129.

In some demonstrative aspects, controller 193 may update one or more of the update rate parameters $\mu_{km}$ in Equation 5, for example, based on AAC information 129.

In one example, controller 193 may be configured to use one or more update rate parameters $\mu_{km}$, for example, some or all of, the update rate parameters $\mu_{km}$. For example, a set of update rate parameters $\mu_{km}$ may be determined or pre-configured based on AAC information 129, e.g., as described above.

Figure 5:
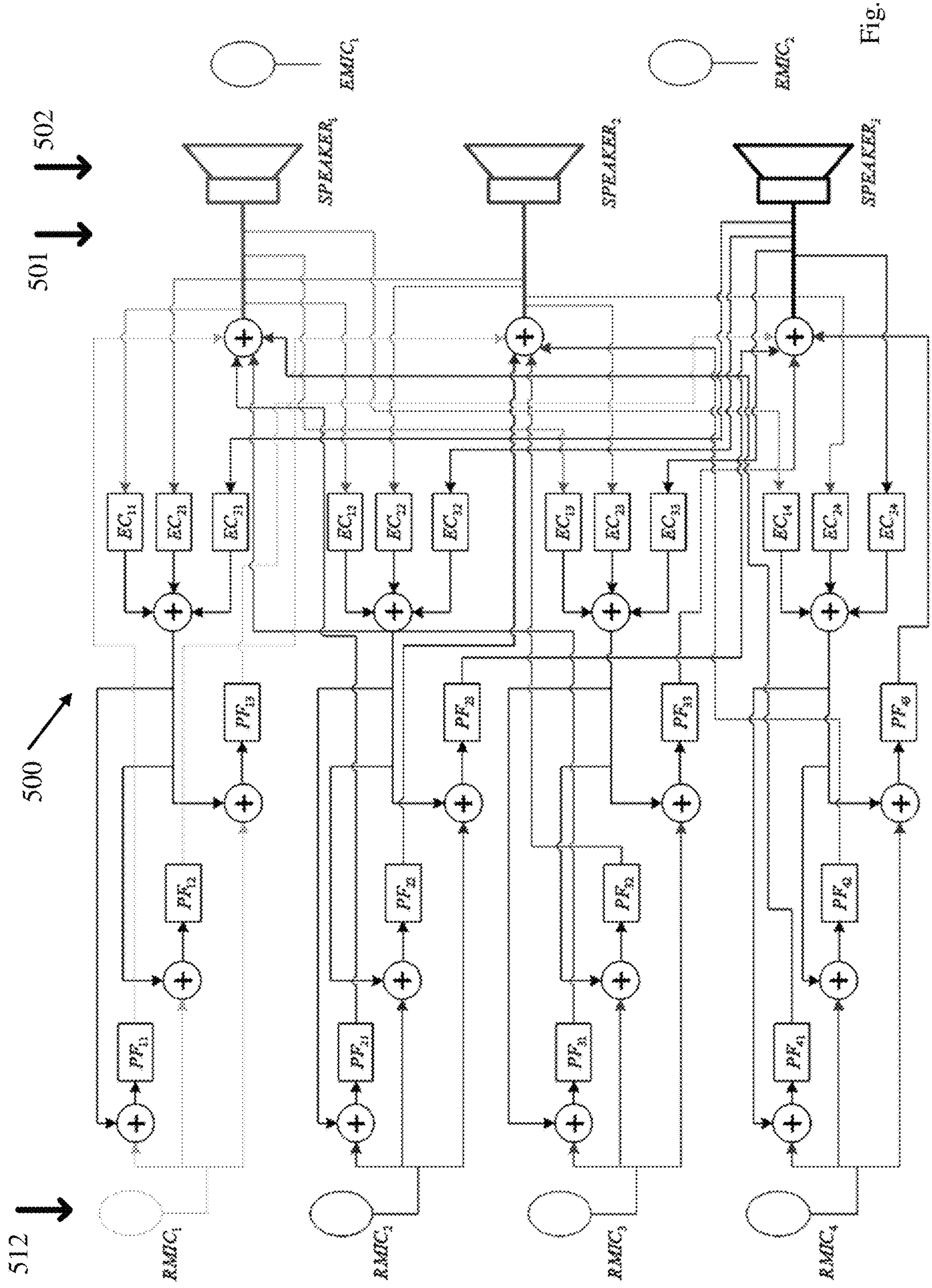
FIG. 5 is a schematic illustration of an implementation of components of a controller of an AAC system, in accordance with some demonstrative aspects.

Reference is made to FIG. 5, which schematically illustrates an implementation of a controller 500 in an AAC system, in accordance with some demonstrative aspects. For example, controller 193 (FIG. 1), controller 300 (FIG. 3) and/or prediction unit 400 (FIG. 4) may include one or more elements of controller 500 (FIG. 5) and/or may perform one or more operations and/or functionalities of controller 500.

In some demonstrative aspects, controller 500 may be configured to receive inputs 512 including noise inputs from a plurality of Microphones (RMIC), and to generate output signals 501 to drive a speaker array 502 including M acoustic transducers, e.g., three speakers or any other number of speakers. For example, the inputs 512 may include inputs 104 (FIG. 1), inputs 304 (FIG. 3) and/or inputs 412 (FIG. 4).

In some demonstrative aspects, controller 500 may be configured to configure, determine, update and/or set one or parameters of Prediction Filters, denoted PF, for example, based on AAC information 129 (FIG. 1), e.g., as described above.

Referring back to FIG. 1, in some demonstrative aspects, AAC controller 193 may be configured according to a hybrid scheme, e.g., as described below.

In some demonstrative aspects, the hybrid scheme may be configured to apply at least one noise prediction filter and at least one residual-noise prediction filter, e.g., as described below.

In some demonstrative aspects, the noise prediction filter may be configured to be applied to a prediction filter input, which may be based on the noise input 104, e.g., as described below.

In some demonstrative aspects, the residual-noise prediction filter may be configured to be applied to a prediction filter input, which may be based on the residual-noise input 106, e.g., as described below.

In some demonstrative aspects, the hybrid scheme may include an adaptive hybrid scheme, e.g., as described below.

In some demonstrative aspects, the adaptive hybrid scheme may be configured to adaptively update at least one of the noise prediction filter and/or the residual-noise prediction filter, e.g., as described below.

For example, controller 193 may be configured to update one or more prediction parameters of at least one of the noise prediction filter and/or the residual-noise prediction filter, for example, based on AAC information 129.

In some demonstrative aspects, controller 193 may be configured to update one or more prediction parameters of at least one of the noise prediction filter and/or the residual-noise prediction filter, for example, by updating weights, coefficients, functions, and/or any other additional or alternative parameter to be utilized for determining the sound control pattern 109, e.g., as described below.

Figure 6:
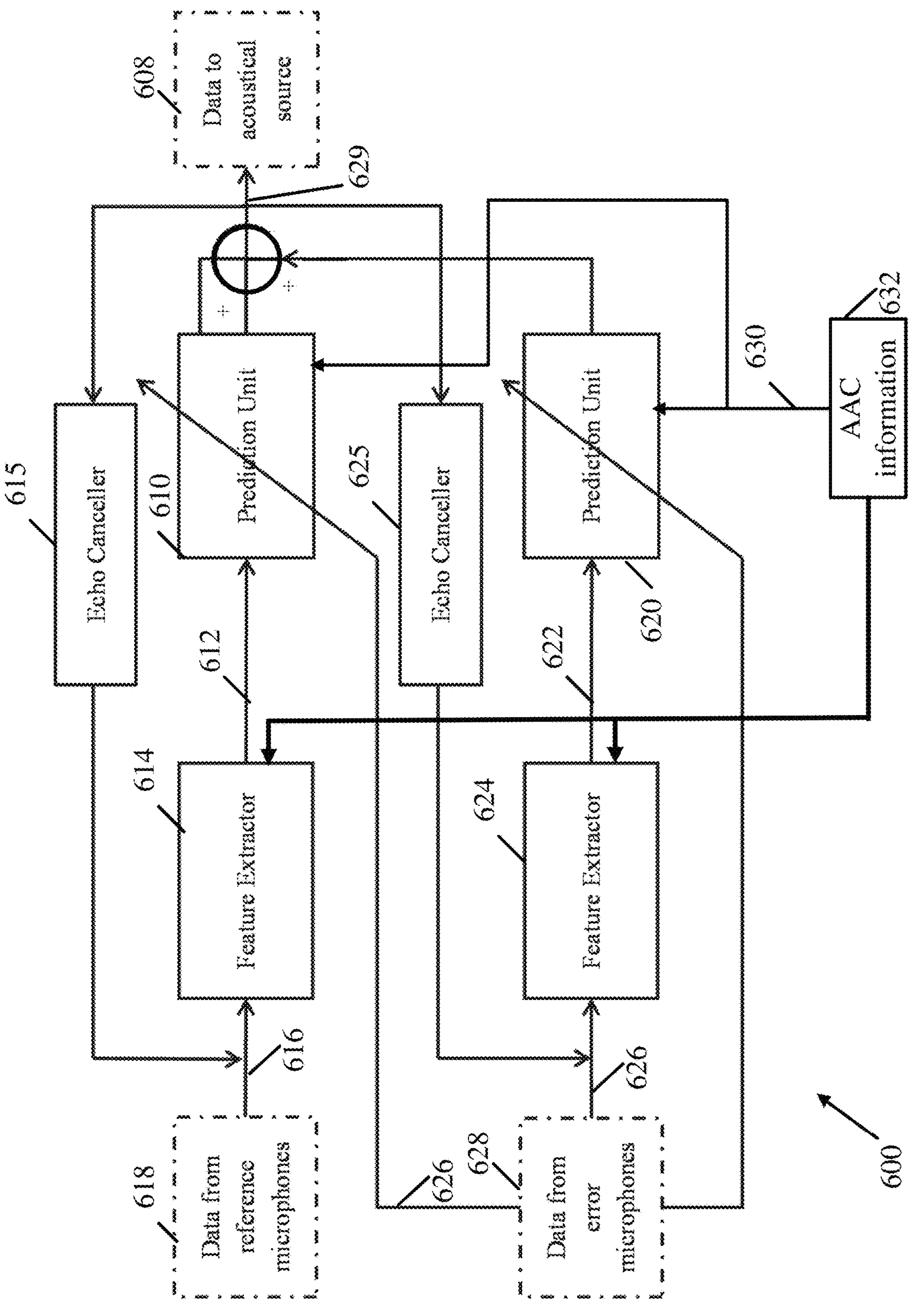
FIG. 6 is a schematic block diagram illustration of a controller, in accordance with some demonstrative aspects.

Reference is now made to FIG. 6, which schematically illustrates a controller 600, in accordance with some demonstrative aspects. For example, controller 193 (FIG. 1) may include one or more elements of controller 600 and/or may perform one or more operations and/or functionalities of controller 600.

In some demonstrative aspects, controller 600 may be configured according to the hybrid scheme.

In some demonstrative aspects, as shown in FIG. 6, controller 600 may include a prediction filter 610 and a prediction filter 620, e.g., as described below.

In some demonstrative aspects, prediction filter 610 and/or prediction filter 620 may be implemented by a Finite Impulse Response (FIR) filter.

In other aspects, prediction filter 610 and/or prediction filter 620 may be implemented by an Infinite Impulse Response (IIR) filter. In one example, prediction filter 610 and/or prediction filter 620 may be implemented by a multi-cascaded in serial second order digital IIR filter.

In other aspects, and other prediction filter may be used.

In some demonstrative aspects, as shown in FIG. 6, the prediction filter 610 may include a noise prediction filter to be applied to a prediction filter input 612, which may be based on a noise input 616, for example, from one or more noise sensors 618 ("reference microphones"). For example, the prediction filter input 612 may be based on noise input 104 (FIG. 1).

In some demonstrative aspects, the prediction filter 620 may include the residual-noise prediction filter to be applied to a prediction filter input 622, which may be based on a residual-noise input 626, for example, from one or more residual-noise sensors 628 ("error microphones"). For example, prediction filter input 622 may be based on residual-noise input 106 (FIG. 1).

In some demonstrative aspects, input 626 may include at least one virtual microphone input corresponding to a residual noise ("noise error") sensed by at least one virtual error sensor at a virtual sensing location, e.g., based on a monitoring input sensed at a monitoring location 103 (FIG. 2). For example, controller 600 may evaluate the noise error at a virtual sensing location based on input 626 and the predicted noise signal 629.

In some demonstrative aspects, as shown in FIG. 6, controller 600 may generate a sound control signal 629 based on an output of the prediction unit 610 and an output of the prediction unit 620, and may output the sound control signal 629 to an acoustic transducer 608.

In some demonstrative aspects, controller 600 may generate sound control signal 629 configured to control, reshape, reduce and/or eliminate the noise energy and/or wave amplitude of one or more sound patterns within a sound control zone, while the noise energy and/or wave amplitude of one or more other sound patterns may not be affected within the sound control zone, e.g., as described below.

In some demonstrative aspects, e.g., as shown in FIG. 6, controller 600 may include an extractor 614 to extract a plurality of disjoint reference acoustic patterns from input 616. According to these aspects, prediction filter input 612 may include the plurality of disjoint reference acoustic patterns. In other aspects, extractor 614 may be excluded, and prediction filter input 612 may be generated directly or indirectly based on input 616, e.g., according to any other algorithm and/or calculation.

In some demonstrative aspects, e.g., as shown in FIG. 6, controller 600 may include an extractor 624 to extract a plurality of disjoint residual-noise acoustic patterns from input 626. According to these aspects, prediction filter input 622 may include the plurality of disjoint residual-noise acoustic patterns. In other aspects, extractor 624 may be excluded, and prediction filter input 622 may be generated directly or indirectly based on input 626, e.g., according to any other algorithm and/or calculation.

In some demonstrative aspects, as shown in FIG. 6, controller 600 may include an echo processing component ("Echo Canceller") 615 configured to reduce, remove, and/or cancel, partially or entirely, a portion of the signal generated by the speaker 608 from an output signal of the reference microphone 618.

In some demonstrative aspects, as shown in FIG. 6, controller 600 may include an echo processing component ("Echo Canceller") 625 configured to reduce, remove, and/or cancel, partially or entirely, a portion of the signal generated by the speaker 608 from an output signal of the residual-noise microphone 628.

In some demonstrative aspects, controller 600 may be configured according to an adaptive hybrid scheme, e.g., as described below.

In some demonstrative aspects, as shown in FIG. 6, controller 600 may be configured to update one or more parameters of the prediction filter 610 and/or prediction filter 620, for example, based on the residual noise input 626.

In some demonstrative aspects, as shown in FIG. 6, controller 600 may identify an AAC configuration 630, for example, based on AAC information 632. For example, AAC information 632 may include AAC information 129 (FIG. 1).

In some demonstrative aspects, controller 600 may be configured to determine an AAC parameter setting based on the AAC information 632, and to determine sound control signal 629, for example, by applying the AAC parameter setting to noise inputs 616 and/or residual-noise inputs 626, e.g., as described below.

In some demonstrative aspects, controller 600 may be configured to adapt the AAC parameter setting, for example, based on a change in the AAC information 632, e.g., as described below.

In some demonstrative aspects, controller 600 may be configured to determine a prediction filter setting of prediction unit 610 and/or prediction unit 620, for example, based on the AAC information 449, and to determine sound control signal 629, for example, based on the prediction filter setting, e.g., as described below.

In some demonstrative aspects, controller 600 may be configured to determine a prediction filter setting including a prediction filter weight vector to be applied by the prediction filter for determining the sound control signal 629 based on noise inputs 616 and/or residual-noise inputs 626, e.g., as described below.

In some demonstrative aspects, controller 600 may be configured to determine a prediction filter setting including an update rate parameter for updating the prediction filter weight vector, e.g., as described below.

In some demonstrative aspects, controller 600 may be configured to determine a path transfer function setting of one or more path transfer functions, for example, based on the AAC information 632, and to apply the path transfer function setting for determining the sound control signal 629, for example, based noise inputs 616 and/or residual-noise inputs 626, e.g., as described below.

In some demonstrative aspects, controller 600 may be configured to update one or more parameters of the prediction filter 610, for example, based on AAC information 632.

In some demonstrative aspects, controller 600 may be configured to update one or more parameters of the prediction filter 620, for example, based on AAC information 632.

In some demonstrative aspects, controller 600 may apply any suitable linear and/or non-linear function to prediction filter input 612 and/or prediction filter input 622. For example, prediction filter 620 and/or prediction filter 620 may be configured according to a liner estimation function, or non-linear estimation function, e.g., a radial basis function.

In some demonstrative aspects, controller 600 may be configured to determine, update, and/or adjust, e.g., in real-time, a setting of at least one acoustic pattern extractor parameter of extractor 614 and/or extractor 624, for example, based on the AAC information 632. For example, extractor 614 may be configured to determine the plurality of disjoint reference acoustic patterns for input 612, for example, based on the acoustic pattern extractor parameter setting, which is based on the AAC information 632. For example, extractor 624 may be configured to determine the plurality of disjoint residual-noise acoustic patterns for input 622, for example, based on the acoustic pattern extractor parameter setting, which is based on the AAC information 632.

Figure 7:
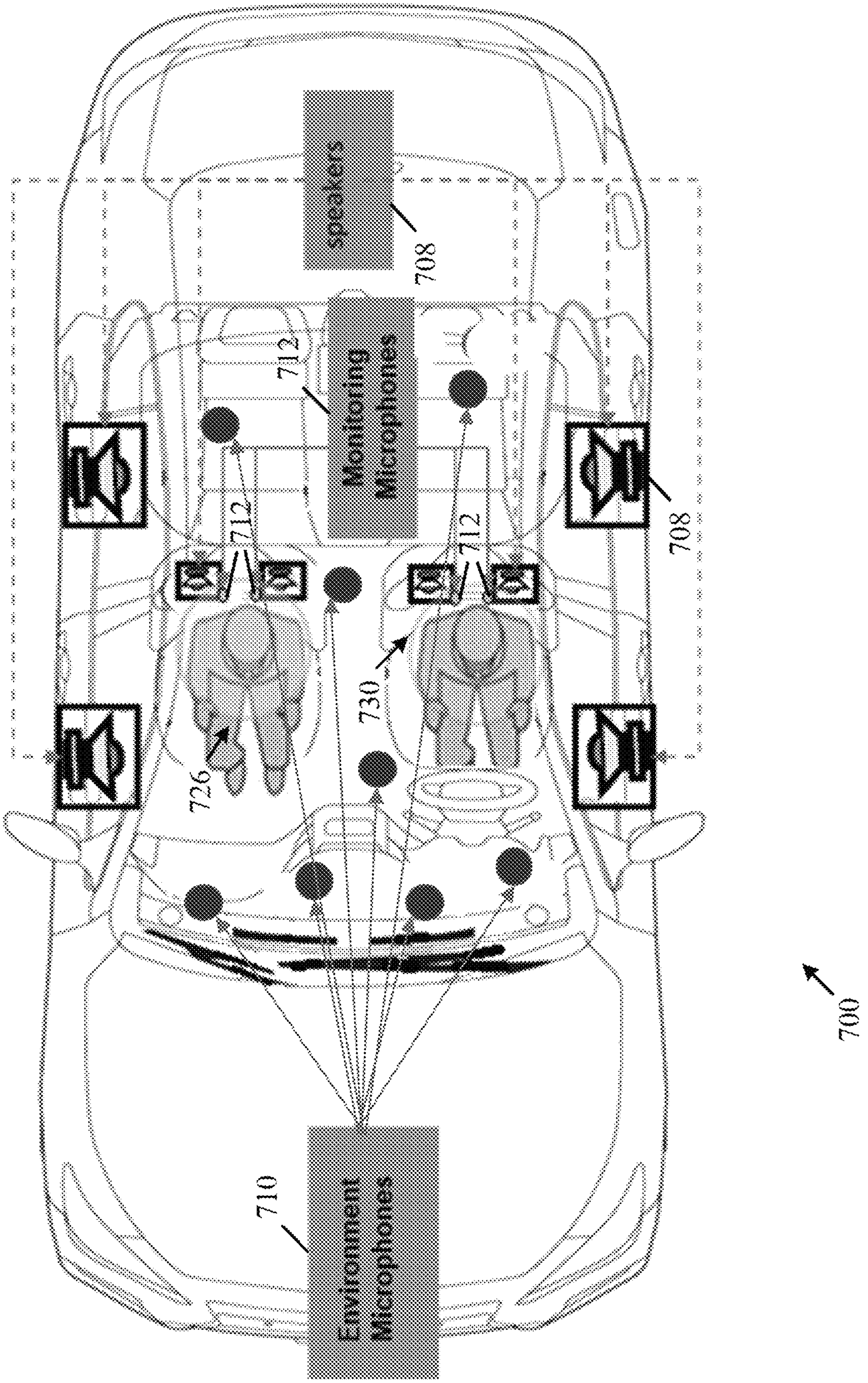
FIG. 7 is a schematic illustration of a vehicle including an AAC system, in accordance with some demonstrative aspects.

Reference is made to FIG. 7, which schematically illustrates a vehicle 700 including an AAC system, in accordance with some demonstrative aspects.

In one example, vehicle 740 may include one or more elements and/or components of AAC system 100 (FIG. 1), for example, for controlling sound within one or more sound control zones within vehicle 700.

In some demonstrative aspects, as shown in FIG. 7, vehicle 700 may include a plurality of speakers 708, a plurality of residual-noise sensors ("monitoring microphones") 712, and a plurality of reference sensors ("environment microphones") 710.

In some demonstrative aspects, vehicle 700 may include AAC controller 102 (FIG. 1) configured to control the plurality of speakers 708 to provide a first sound control zone 730 for a driver of the vehicle 700, e.g., at a location of a headrest of a driver seat.

In some demonstrative aspects, AAC controller 102 (FIG. 1) may be configured to control the plurality of speakers 708 to provide a second sound control zone 726, for example, for a passenger, e.g., at a front seat near the driver seat, for example, at a location of a headrest of the passenger seat.

In some demonstrative aspects, as shown in FIG. 7, the plurality of monitoring microphones 712 may be located within the first and/or second sound control zones 730 and 726.

In some demonstrative aspects, as shown in FIG. 7, the plurality of environment microphones 710 may be located in an environment outside the sound control zones 730 and 726.

In other aspects, vehicle 700 may include any other number of the plurality of speakers 708, the plurality of monitoring microphones 712, and/or the plurality of environment microphones 710, any other arrangement, positions and/or locations of the plurality of speakers 708, the plurality of monitoring microphones 712, and/or the plurality of environment microphones 710, and/or any other additional or alternative components.

Figure 8:
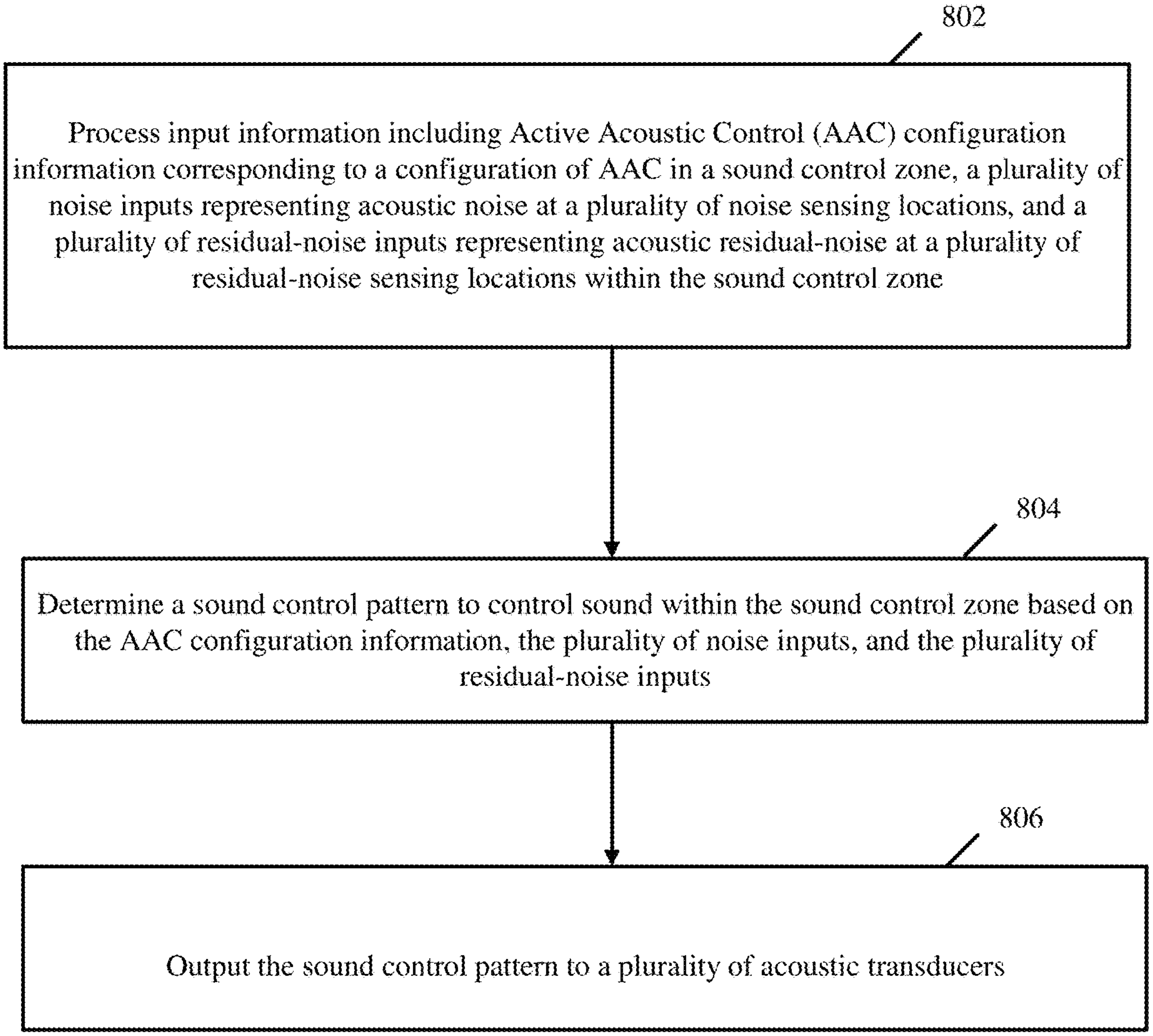
FIG. 8 is a schematic flow-chart illustration of a method of AAC, in accordance with some demonstrative aspects.

Reference is made to FIG. 8, which illustrates a method of AAC. For example, one or more of the operations of FIG. 8 may be performed by one or more components of AAC system 100 (FIG. 1), controller 102 (FIG. 1), controller 193 (FIG. 1), controller 300 (FIG. 3), prediction unit 400 (FIG. 4), controller 500 (FIG. 5), and/or controller 600 (FIG. 6).

In some demonstrative aspects, as indicated at block 802, the method may include processing input information including, for example, AAC configuration information corresponding to a configuration of AAC in a sound control zone, a plurality of noise inputs representing acoustic noise at a plurality of noise sensing locations, and a plurality of residual-noise inputs representing acoustic residual-noise at a plurality of residual-noise sensing locations within the sound control zone. For example, controller 193 (FIG. 1) may be configured to process input information 195 (FIG. 1) including the noise inputs 104 (FIG. 1), residual-noise inputs 106 (FIG. 1), and/or the AAC information 129 (FIG. 1), e.g., as described above.

In some demonstrative aspects, as indicated at block 804, the method may include determining a sound control pattern to control sound within the sound control zone, for example, based on the AAC configuration information, the plurality of noise inputs, and the plurality of residual-noise inputs. For example, controller 193 (FIG. 1) may be configured to determine the sound control pattern based on the input information 195 (FIG. 1) including the noise inputs 104 (FIG. 1), residual-noise inputs 106 (FIG. 1), and/or the AAC information 129 (FIG. 1), e.g., as described above.

In some demonstrative aspects, as indicated at block 806, the method may include outputting the sound control pattern to a plurality of acoustic transducers. For example, controller 193 (FIG. 1) may be configured to output sound control signal 109 (FIG. 1 to control acoustic transducers 108 (FIG. 1) to generate the sound control pattern, e.g., as described above.

Figure 9:
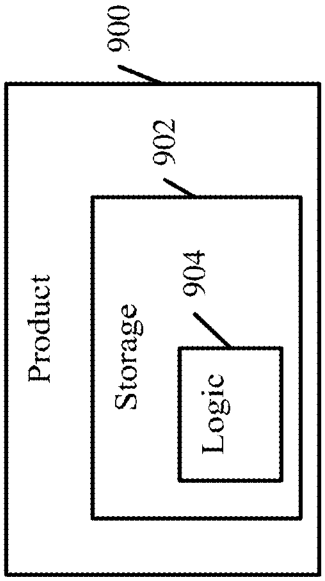
FIG. 9 is a schematic block diagram illustration of a product of manufacture, in accordance with some demonstrative aspects.

Reference is made to FIG. 9, which schematically illustrates a product of manufacture 900, in accordance with some demonstrative aspects. Product 900 may include one or more tangible computer-readable ("machine readable") non-transitory storage media 902, which may include instructions, e.g., computer-executable instructions, for example, implemented by logic 904, operable to, when executed by at least one processor, e.g., a computer processor, enable the at least one processor to cause AAC system 100 (FIG. 1), controller 102 (FIG. 1), controller 193 (FIG. 1), controller 300 (FIG. 3), prediction unit 400 (FIG. 4), controller 500 (FIG. 5), and/or controller 600 (FIG. 6) to perform one or more operations and/or functionalities; to implement one or more operations and/or functionalities at AAC system 100 (FIG. 1), controller 102 (FIG. 1), controller 193 (FIG. 1), controller 300 (FIG. 3), prediction unit 400 (FIG. 4), controller 500 (FIG. 5), and/or controller 600 (FIG. 6); to perform one or more operations; and/or to perform, trigger and/or implement one or more operations and/or functionalities described above with reference to FIGS. 1, 2, 3, 4, 5, 6, 7, and/or 8, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative aspects, product 900 and/or storage media 902 may include one or more types of computer-readable storage media capable of storing data, including volatile memory, non-volatile memory, removable or non-removable memory, erasable or non-erasable memory, writeable or re-writeable memory, and the like. For example, storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, an optical disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function.

Examples

The following examples pertain to further aspects.

Example 1 includes an apparatus comprising an input to receive input information, the input information comprising Active Acoustic Control (AAC) configuration information corresponding to a configuration of AAC in a sound control zone; a plurality of noise inputs representing acoustic noise at a plurality of noise sensing locations; and a plurality of residual-noise inputs representing acoustic residual-noise at a plurality of residual-noise sensing locations within the sound control zone; a controller comprising logic and circuitry configured to determine a sound control pattern to control sound within the sound control zone, the controller configured to determine the sound control pattern based on the AAC configuration information, the plurality of noise inputs, and the plurality of residual-noise inputs; and an output to output the sound control pattern to a plurality of acoustic transducers.

Example 2 includes the subject matter of Example 1, and optionally, wherein the controller is configured to determine an AAC parameter setting based on the AAC configuration information, and to determine the sound control pattern by applying the AAC parameter setting to at least one of the plurality of noise inputs, or the plurality of residual-noise inputs.

Example 3 includes the subject matter of Example 2, and optionally, wherein the controller is configured to adapt the AAC parameter setting based on a change in the AAC configuration information.

Example 4 includes the subject matter of any one of Examples 1-3, and optionally, wherein the controller is configured to determine a prediction filter setting of at least one prediction filter based on the AAC configuration information, and to determine the sound control pattern based on the prediction filter setting.

Example 5 includes the subject matter of Example 4, and optionally, wherein the prediction filter setting comprises a prediction filter weight vector to be applied by the prediction filter for determining the sound control pattern based on at least one of the plurality of noise inputs or the plurality of residual-noise inputs.

Example 6 includes the subject matter of Example 5, and optionally, wherein the prediction filter setting comprises an update rate parameter for updating the prediction filter weight vector.

Example 7 includes the subject matter of any one of Examples 1-6, and optionally, wherein the controller is configured to determine a path transfer function setting of one or more path transfer functions based on the AAC configuration information, and to apply the path transfer function setting for determining the sound control pattern based on at least one of the plurality of noise inputs or the plurality of residual-noise inputs.

Example 8 includes the subject matter of Example 7, and optionally, wherein the path transfer function setting comprises a setting of a path transfer function between an acoustic transducer and a noise sensing location.

Example 9 includes the subject matter of Example 7 or 8, and optionally, wherein the path transfer function setting comprises a setting of a path transfer function between an acoustic transducer and a residual-noise sensing location.

Example 10 includes the subject matter of any one of Examples 7-9, and optionally, wherein the path transfer function setting comprises a setting of a path transfer function between an acoustic transducer and a monitoring location, wherein at least one of the one or more residual-noise inputs is based monitoring input sensed at the monitoring location.

Example 11 includes the subject matter of any one of Examples 1-10, and optionally, wherein the controller is configured to determine a noise extraction function based on the AAC configuration information, to determine one or more extracted acoustic patterns by applying the noise extraction function to at least one of the plurality of noise inputs or the plurality of residual-noise inputs, and to determine the sound control pattern based on the one or more extracted acoustic patterns.

Example 12 includes the subject matter of any one of Examples 1-11, and optionally, wherein the controller is configured to determine a sound control profile based on the AAC configuration information, and to determine the sound control pattern based on the sound control profile.

Example 13 includes the subject matter of Example 12, and optionally, wherein the sound control profile comprises a setting of one or more sound control parameters, the controller configured to determine the sound control pattern based on the setting of the one or more sound control parameters.

Example 14 includes the subject matter of any one of Examples 1-13, and optionally, comprising a memory to store a plurality of sound control profiles corresponding to a plurality of sound control configurations, respectively, wherein the controller is configured to select from the plurality of sound control profiles a selected sound control profile based on the AAC configuration information, and to determine the sound control pattern based on the selected sound control profile.

Example 15 includes the subject matter of Example 14, and optionally, wherein the plurality of sound control profiles comprises a user-based profile corresponding to a user, the user-based profile comprising a setting of one or more sound control parameters based on a preference of the user, wherein the AAC configuration information comprises user identity information corresponding to an identity of the user.

Example 16 includes the subject matter of any one of Examples 1-15, and optionally, wherein the controller is configured to, based on the AAC configuration information, selectively mute the sound control pattern, adjust a level of the sound control pattern, or freeze an adaptation of the sound control pattern.

Example 17 includes the subject matter of any one of Examples 1-16, and optionally, wherein the AAC configuration information comprises real-time information corresponding to a real-time acoustic configuration of the sound control zone.

Example 18 includes the subject matter of any one of Examples 1-17, and optionally, wherein the AAC configuration information comprises vehicle speed information corresponding to a speed of a vehicle comprising the sound control zone.

Example 19 includes the subject matter of any one of Examples 1-18, and optionally, wherein the AAC configuration information comprises engine information corresponding to an engine of a vehicle comprising the sound control zone.

Example 20 includes the subject matter of any one of Examples 1-19, and optionally, wherein the AAC configuration information comprises braking system information corresponding to a braking system of a vehicle comprising the sound control zone.

Example 21 includes the subject matter of any one of Examples 1-20, and optionally, wherein the AAC configuration information comprises road detection information from a road detection system of a vehicle comprising the sound control zone.

Example 22 includes the subject matter of any one of Examples 1-21, and optionally, wherein the AAC configuration information comprises steering information corresponding to a steering system of a vehicle comprising the sound control zone.

Example 23 includes the subject matter of any one of Examples 1-22, and optionally, wherein the AAC configuration information comprises tire information corresponding to one or more tires of a vehicle comprising the sound control zone.

Example 24 includes the subject matter of any one of Examples 1-23, and optionally, wherein the AAC configuration information comprises seat position information corresponding to one or more seats of a vehicle comprising the sound control zone.

Example 25 includes the subject matter of any one of Examples 1-24, and optionally, wherein the AAC configuration information comprises passenger information corresponding to one or more passengers of a vehicle comprising the sound control zone.

Example 26 includes the subject matter of any one of Examples 1-25, and optionally, wherein the AAC configuration information comprises opening-state information corresponding to a state of an opening of a vehicle comprising the sound control zone.

Example 27 includes the subject matter of any one of Examples 1-26, and optionally, wherein the AAC configuration information comprises audio-system information corresponding to an audio-system of a vehicle comprising the sound control zone.

Example 28 includes the subject matter of any one of Examples 1-27, and optionally, wherein the AAC configuration information comprises climate information corresponding to at least one of a climate inside the sound control zone or a climate outside the sound control zone.

Example 29 includes the subject matter of any one of Examples 1-28, and optionally, wherein the AAC configuration information comprises user position information corresponding to a position of at least one of a head or an ear of a user in the sound control zone.

Example 30 includes the subject matter of any one of Examples 1-29, and optionally, wherein the AAC configuration information comprises user identity information corresponding to an identity of a user to control a user preference with respect to the sound control zone.

Example 31 includes the subject matter of any one of Examples 1-30, and optionally, wherein the AAC configuration information comprises vehicular system configuration information corresponding to a configuration of a mode of operation of one or more vehicular systems of a vehicle comprising the sound control zone.

Example 32 includes the subject matter of any one of Examples 1-31, and optionally, wherein the AAC configuration information comprises vehicular sensor information from one or more vehicular sensors of a vehicle comprising the sound control zone.

Example 33 includes the subject matter of any one of Examples 1-32, and optionally, wherein the input is configured to receive the AAC configuration information via a system bus of a vehicle comprising the sound control zone.

Example 34 includes the subject matter of Example 33, and optionally, wherein the input is configured to receive the AAC configuration information via at least one of Controller Area Network (CAN) bus information received via a CAN bus of the vehicle, A to B (A2B) bus information received via an A2B bus of the vehicle, Media Oriented Systems Transport (MOST) bus information received via a MOST bus of the vehicle, wireless communication information received over a wireless communication link, or Ethernet bus information received via an Ethernet bus of the vehicle.

Example 35 includes a product comprising one or more tangible computer-readable non-transitory storage media comprising instructions operable to, when executed by at least one processor, enable the at least one processor to cause a sound control system to control sound within a sound control zone, the instructions, when executed, to cause the sound control system to process input information, the input information comprising system bus information received via a system bus of the vehicle; Active Acoustic Control (AAC) configuration information corresponding to a configuration of AAC in the sound control zone; a plurality of noise inputs representing acoustic noise at a plurality of noise sensing locations; and a plurality of residual-noise inputs representing acoustic residual-noise at a plurality of residual-noise sensing locations within the sound control zone; determine a sound control pattern to control sound within the sound control zone based on the AAC configuration information, the plurality of noise inputs, and the plurality of residual-noise inputs; and output the sound control pattern to a plurality of acoustic transducers.

Example 36 includes the subject matter of Example 35, and optionally, wherein the processor is configured to cause the sound control system to perform one or more operations according to any of Examples 1-34.

Example 37 includes a vehicle comprising a plurality of seats; a sound control system configured to control sound within a sound control zone relative to a seat, the sound control system comprising a plurality of acoustic transducers; a plurality of noise sensors to generate a plurality of noise inputs representing acoustic noise at a plurality of noise sensing locations; a plurality of residual-noise sensors to generate a plurality of residual-noise inputs representing acoustic residual-noise at a plurality of residual-noise sensing locations within the sound control zone; and a controller comprising logic and circuitry configured to determine a sound control pattern to control sound within the sound control zone and to output the sound control pattern to the plurality of acoustic transducers, the controller configured to determine the sound control pattern based on the plurality of noise inputs, the plurality of residual-noise inputs, and Active Acoustic Control (AAC) configuration information corresponding to a configuration of AAC in the sound control zone.

Example 38 includes the subject matter of Example 37, and optionally, comprising the apparatus according to any of Examples 1-34.

Example, 39 includes a sound control system comprising the apparatus of any of Examples 1-34.

Example 40 comprises an apparatus comprising means for executing any of the described operations of Examples 1-34.

Example 41 comprises an apparatus comprising: a memory interface; and processing circuitry configured to: perform any of the described operations of Examples 1-34.

Example 42 comprises a method comprising any of the described operations of Examples 1-34.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

an input to receive input information, the input information comprising:

a plurality of noise inputs representing acoustic noise at a plurality of noise sensing locations;

a plurality of residual-noise inputs representing acoustic residual-noise at a plurality of residual-noise sensing locations within a sound control zone; and Active Acoustic Control (AAC) configuration information representing one or more parameters affecting a real-time configuration of AAC in the sound control zone, wherein the AAC configuration information is different from the plurality of noise inputs and the plurality of residual-noise inputs, wherein the AAC configuration information comprises information received via a system bus of a vehicle comprising the sound control zone;

a controller comprising logic and circuitry configured to determine a sound control pattern to control sound within the sound control zone, the controller configured to determine the sound control pattern based on the AAC configuration information, the plurality of noise inputs, and the plurality of residual-noise inputs, wherein the controller is configured to determine a prediction filter setting of at least one prediction filter based on the AAC configuration information, and to determine the sound control pattern based on the prediction filter setting; and an output to output the sound control pattern to a plurality of acoustic transducers.

2. The apparatus of claim 1, wherein the controller is configured to determine an AAC parameter setting based on the AAC configuration information, and to determine the sound control pattern by applying the AAC parameter setting to at least one of the plurality of noise inputs, or the plurality of residual-noise inputs.

3. The apparatus of claim 2, wherein the controller is configured to adapt the AAC parameter setting based on a change in the AAC configuration information.

4. The apparatus of claim 1, wherein the prediction filter setting comprises a prediction filter weight vector to be applied by the prediction filter for determining the sound control pattern based on at least one of the plurality of noise inputs or the plurality of residual-noise inputs.

5. The apparatus of claim 4, wherein the prediction filter setting comprises an update rate parameter for updating the prediction filter weight vector.

6. The apparatus of claim 1, wherein the controller is configured to determine a path transfer function setting of one or more path transfer functions based on the AAC configuration information, and to apply the path transfer function setting for determining the sound control pattern based on at least one of the plurality of noise inputs or the plurality of residual-noise inputs.

7. The apparatus of claim 6, wherein the path transfer function setting comprises a setting of at least one of a path transfer function between an acoustic transducer and a noise sensing location, a path transfer function between an acoustic transducer and a residual-noise sensing location, or a path transfer function between an acoustic transducer and a monitoring location, wherein at least one of the one or more residual-noise inputs is based on a monitoring input sensed at the monitoring location.

8. The apparatus of claim 1, wherein the controller is configured to determine a noise extraction function based on the AAC configuration information, to determine one or more extracted acoustic patterns by applying the noise extraction function to at least one of the plurality of noise inputs or the plurality of residual-noise inputs, and to determine the sound control pattern based on the one or more extracted acoustic patterns.

9. The apparatus of claim 1, wherein the controller is configured to determine a sound control profile based on the AAC configuration information, and to determine the sound control pattern based on the sound control profile.

10. The apparatus of claim 9, wherein the sound control profile comprises a setting of one or more sound control parameters, the controller configured to determine the sound control pattern based on the setting of the one or more sound control parameters.

11. The apparatus of claim 1 comprising a memory to store a plurality of sound control profiles corresponding to a plurality of sound control configurations, respectively, wherein the controller is configured to select from the plurality of sound control profiles a selected sound control profile based on the AAC configuration information, and to determine the sound control pattern based on the selected sound control profile.

12. The apparatus of claim 11, wherein the plurality of sound control profiles comprises a user-based profile corresponding to a user, the user-based profile comprising a setting of one or more sound control parameters based on a preference of the user, wherein the AAC configuration information comprises user identity information corresponding to an identity of the user.

13. The apparatus of claim 1, wherein the controller is configured to, based on the AAC configuration information, selectively mute the sound control pattern, adjust a level of the sound control pattern, or freeze an adaptation of the sound control pattern.

14. The apparatus of claim 1, wherein the AAC configuration information comprises vehicle speed information corresponding to a speed of the vehicle comprising the sound control zone.

15. The apparatus of claim 1, wherein the AAC configuration information comprises engine information corresponding to an engine of the vehicle comprising the sound control zone.

16. The apparatus of claim 1, wherein the AAC configuration information comprises at least one of braking system information, road detection information, steering information, tire information, seat position information, or opening-state information, wherein the braking system information comprises information corresponding to a braking system of the vehicle comprising the sound control zone, the road detection information comprises information from a road detection system of the vehicle, the steering information comprises information corresponding to a steering system of the vehicle, the tire information comprises information corresponding to one or more tires of the vehicle, the seat position information comprises information corresponding to one or more seats of the vehicle, the opening-state information comprises information corresponding to a state of an opening of the vehicle.

17. The apparatus of claim 1, wherein the AAC configuration information comprises passenger information corresponding to one or more passengers of the vehicle comprising the sound control zone.

18. The apparatus of claim 1, wherein the AAC configuration information comprises audio-system information corresponding to an audio-system of the vehicle comprising the sound control zone.

19. The apparatus of claim 1, wherein the AAC configuration information comprises climate information corresponding to at least one of a climate inside the sound control zone or a climate outside the sound control zone.

20. The apparatus of claim 1, wherein the AAC configuration information comprises user position information corresponding to a position of at least one of a head or an ear of a user in the sound control zone.

21. The apparatus of claim 1, wherein the AAC configuration information comprises user identity information corresponding to an identity of a user to control a user preference with respect to the sound control zone.

22. The apparatus of claim 1, wherein the AAC configuration information comprises vehicular system configuration information corresponding to a configuration of a mode of operation of one or more vehicular systems of the vehicle comprising the sound control zone.

23. The apparatus of claim 1, wherein the AAC configuration information comprises vehicular sensor information from one or more vehicular sensors of the vehicle comprising the sound control zone.

24. The apparatus of claim 1, wherein the input is configured to receive the AAC configuration information via at least one of Controller Area Network (CAN) bus information received via a CAN bus of the vehicle, A to B (A2B) bus information received via an A2B bus of the vehicle, Media Oriented Systems Transport (MOST) bus information received via a MOST bus of the vehicle, wireless communication information received over a wireless communication link, or Ethernet bus information received via an Ethernet bus of the vehicle.

25. A product comprising one or more tangible computer-readable non-transitory storage media comprising instructions operable to, when executed by at least one processor, enable the at least one processor to cause a sound control system to control sound within a sound control zone, the instructions, when executed, to cause the sound control system to:

process input information, the input information comprising:

a plurality of noise inputs representing acoustic noise at a plurality of noise sensing locations;

a plurality of residual-noise inputs representing acoustic residual-noise at a plurality of residual-noise sensing locations within the sound control zone; and Active Acoustic Control (AAC) configuration information representing one or more parameters affecting a real-time configuration of AAC in the sound control zone, wherein the AAC configuration information is different from the plurality of noise inputs and the plurality of residual-noise inputs, wherein the AAC configuration information comprises information received via a system bus of a vehicle comprising the sound control zone;

determine a sound control pattern to control sound within the sound control zone based on the AAC configuration information, the plurality of noise inputs, and the plurality of residual-noise inputs, wherein the instructions, when executed, cause the sound control system to determine a prediction filter setting of at least one prediction filter based on the AAC configuration information, and to determine the sound control pattern based on the prediction filter setting; and output the sound control pattern to a plurality of acoustic transducers.

26. The product of claim 25, wherein the instructions, when executed, cause the sound control system to determine an AAC parameter setting based on the AAC configuration information, and to determine the sound control pattern by applying the AAC parameter setting to at least one of the plurality of noise inputs, or the plurality of residual-noise inputs.

27. A vehicle comprising:

a plurality of seats;

a sound control system configured to control sound within a sound control zone relative to a seat, the sound control system comprising:

a plurality of acoustic transducers;

a plurality of noise sensors to generate a plurality of noise inputs representing acoustic noise at a plurality of noise sensing locations;

a plurality of residual-noise sensors to generate a plurality of residual-noise inputs representing acoustic residual-noise at a plurality of residual-noise sensing locations within the sound control zone; and a controller comprising logic and circuitry configured to determine a sound control pattern to control sound within the sound control zone and to output the sound control pattern to the plurality of acoustic transducers, the controller configured to determine the sound control pattern based on the plurality of noise inputs, the plurality of residual-noise inputs, and Active Acoustic Control (AAC) configuration information representing one or more parameters affecting a real-time configuration of AAC in the sound control zone, wherein the AAC configuration information is different from the plurality of noise inputs and the plurality of residual-noise inputs, wherein the AAC configuration information comprises information received via a system bus of the vehicle, wherein the controller is configured to determine a prediction filter setting of at least one prediction filter based on the AAC configuration information, and to determine the sound control pattern based on the prediction filter setting.

28. The vehicle of claim 27, wherein the controller is configured to determine a path transfer function setting of one or more path transfer functions based on the AAC configuration information, and to apply the path transfer function setting for determining the sound control pattern based on at least one of the plurality of noise inputs or the plurality of residual-noise inputs.

* * * * *